US007158450B2

(12) United States Patent
Wada et al.

(10) Patent No.: US 7,158,450 B2
(45) Date of Patent: Jan. 2, 2007

(54) OPTICAL ELEMENT, OPTICAL HEAD, OPTICAL RECORDING REPRODUCING APPARATUS AND OPTICAL RECORDING/REPRODUCING METHOD

(75) Inventors: Hidenori Wada, Uji (JP); Tetsuo Saimi, Hirakata (JP); Daisuke Ogata, Amagasaki (JP); Seiji Nishino, Osaka (JP); Hiroaki Yamamoto, Kawabe-gun (JP); Shin-ichi Kadowaki, Sanda (JP); Yoshiaki Komma, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 232 days.

(21) Appl. No.: 10/892,066

(22) Filed: Jul. 14, 2004

(65) Prior Publication Data

US 2004/0264347 A1   Dec. 30, 2004

Related U.S. Application Data

(62) Division of application No. 09/911,143, filed on Jul. 23, 2001.

(30) Foreign Application Priority Data

Jul. 24, 2000  (JP)  .............................. 2000-222265

(51) Int. Cl.
 *G11B 7/00* (2006.01)
 *G11B 7/135* (2006.01)
 *G11B 7/20* (2006.01)
(52) U.S. Cl. .............................. 369/44.23; 369/112.02; 369/94
(58) Field of Classification Search ............ 369/112.02

See application file for complete search history.

(56) References Cited

U.S. PATENT DOCUMENTS

| 3,813,142 | A | * | 5/1974 | Buhrer ........................ 385/10 |
| 4,817,074 | A | * | 3/1989 | Yamanaka ............... 369/44.24 |
| 4,937,539 | A | * | 6/1990 | Grinberg et al. ............ 349/202 |
| 5,093,747 | A | * | 3/1992 | Dorschner .................. 359/316 |
| 5,122,888 | A |   | 6/1992 | Iizuka et al. |
| 5,212,583 | A | * | 5/1993 | Vali et al. .................... 359/245 |
| 5,471,339 | A | * | 11/1995 | Ise et al. ..................... 359/275 |
| 5,828,648 | A |   | 10/1998 | Takasu et al. |
| 5,846,626 | A |   | 12/1998 | Kashiwagi et al. |
| 5,880,872 | A | * | 3/1999 | Udaka ......................... 359/273 |
| 5,943,159 | A | * | 8/1999 | Zhu ............................. 359/316 |

(Continued)

FOREIGN PATENT DOCUMENTS

EP   0 565 381   10/1993

(Continued)

*Primary Examiner*—Andrea Wellington
*Assistant Examiner*—Jorge L. Ortiz-Criado
(74) *Attorney, Agent, or Firm*—Hamre, Schumann, Mueller & Larson, P.C.

(57) ABSTRACT

The invention presents an optical element with which an optical head can be configured, in which there is little deterioration of the correctional effect when the objective lens shifts, as well as an optical head and an optical recording/reproducing apparatus using such an optical element. The invention also presents a novel optical recording/reproducing apparatus and optical recording/reproducing method. The optical element, includes a first voltage application electrode 13, a first opposing electrode 17 arranged in opposition to the first voltage application electrode 13, and a first phase changing layer 15 arranged between the first voltage application electrode 13 and the first opposing electrode 17. By changing a voltage between the first voltage application electrode 13 and the first opposing electrode 17, a phase that converts plane waves into spherical waves is imparted on light that is incident on the first phase changing layer 15.

4 Claims, 16 Drawing Sheets

U.S. PATENT DOCUMENTS

| | | |
|---|---|---|
| 5,972,459 A | 10/1999 | Kawakubo et al. |
| 6,115,336 A | 9/2000 | Okada |
| 6,172,957 B1 | 1/2001 | Ogasawara |
| 6,175,548 B1 | 1/2001 | Kashiwagi |
| 6,192,022 B1 | 2/2001 | Hendriks et al. |
| 6,246,656 B1 | 6/2001 | Kawakubo et al. |
| 6,344,713 B1 | 2/2002 | Awaji et al. |
| 6,359,674 B1 | 3/2002 | Horiuchi |
| 6,430,139 B1 * | 8/2002 | Yoo et al. ............... 369/112.23 |
| 6,480,454 B1 | 11/2002 | Wada et al. |
| 6,690,500 B1 | 2/2004 | Ogasawara et al. |
| 6,747,781 B1 | 6/2004 | Trisnadi |
| 6,778,246 B1 * | 8/2004 | Sun et al. .................... 349/146 |
| 6,785,035 B1 | 8/2004 | Uematsu et al. |
| 2001/0012257 A1 | 8/2001 | Suzuki et al. |

FOREIGN PATENT DOCUMENTS

| | | |
|---|---|---|
| EP | 0 883 115 | 12/1998 |
| EP | 1 011 009 | 6/2000 |
| EP | 1 043 615 | 10/2000 |
| JP | 6-27322 | 2/1994 |
| JP | 8-235638 | 9/1996 |
| JP | 8-315423 | 11/1996 |
| JP | 9-212917 | 8/1997 |
| JP | 10-162432 | 6/1998 |
| JP | 10-222870 | 8/1998 |
| JP | 10-269611 | 10/1998 |
| JP | 10-334575 | 12/1998 |
| JP | 2000-131603 | 5/2000 |
| JP | 2000-171346 | 6/2000 |
| JP | 2000-235727 | 8/2000 |
| JP | 2001-084631 | 3/2001 |
| JP | 2001-143303 | 5/2001 |

* cited by examiner

OPTICAL ELEMENT, OPTICAL HEAD, OPTICAL RECORDING REPRODUCING APPARATUS AND OPTICAL RECORDING/REPRODUCING METHOD

This application is a division of application Ser. No. 09/911,143, filed Jul. 23, 2001, which application is incorporated herein by reference.

BACKGROUND OF THE INVENTION

1. Field of the Invention

The present invention relates to optical elements, optical heads and optical recording/reproducing apparatuses using the same, and optical recording/reproducing methods.

2. Description of the Related Art

Digital versatile disks (DVDs) can record digital information at a recording density that is about six times as high as that of compact disks (CDs), so that they are noted as high-capacity optical recording media. In order to reproduce high-density DVDs, the wavelength of the laser beam has to be shorter, and the numerical aperture (NA) of the objective lens has to be larger than for reproducing CDs. Therefore, a laser beam with a wavelength of 650 nm is used for reproducing DVDs (compared to 780 nm for CDs), and an objective lens with a NA of 0.6 is used (compared to 0.45 for CDs). Attempts have been made to increase the recording density by making the wavelength of the laser beam even shorter and the NA even larger. However, when the wavelength is shortened and the NA of the objective lens is increased, the recording and reproducing margins for positional deviations of the recording layer in the thickness direction become small. Consequently, in that case, it is necessary to perform a correction of spherical aberration.

Moreover, optical recording media provided with a plurality of recording layers have a high recording density, but in that case, the distance from the surface of the optical recording medium to the recording layer (also referred to as "base material thickness" in the following) varies from recording layer to recording layer, thus causing spherical aberration. To correct this spherical aberration, an optical head correcting wavefront aberration (in particular, spherical aberration) with a liquid crystal element has been proposed (JP H10-269611A).

An example of this conventional optical head is explained with reference to FIG. 13. FIG. 13 schematically illustrates the configuration of a conventional optical head 200 (also referred to as an "optical pickup"). As shown in FIG. 13, the optical head 200 includes a light source 201, a polarizing beam splitter 202, a liquid crystal panel 203, a λ/4 plate 204, an objective lens 205, a focusing lens 206, an optical detector 207, a base material thickness sensor 208, and an optical element driving circuit 209. Signals are recorded on or reproduced from the optical disk 210 with this optical head 200.

The light source 201 is made of a semiconductor laser element, which emits coherent light for recording/reproducing towards the recording layer of the optical disk 210. The polarizing beam splitter 202 serves as an element for separating the light. The liquid crystal panel 203 includes a plurality of electrodes 203a to 203d, arranged concentrically as shown in FIG. 14, which change the refractive index of the liquid crystal by applying different voltages to the electrodes, thus correcting aberration. The λ/4 plate 204 is made of a birefringent material, and converts linearly polarized light into circularly polarized light. The objective lens 205 focuses light on the recording layer of the optical disk 210. The focusing lens 206 focuses light that has been reflected by the recording layer of the optical disk 210 on the optical detector 207. The optical detector 207 receives the light that has been reflected by the recording layer of the optical disk 210 and converts it into an electrical signal.

The following is an explanation of the operation of this optical head. Linearly polarized light that is emitted from the light source 201 passes through the polarizing beam splitter 202 and enters the liquid crystal panel 203. If the recording layer of the optical disk 210 is arranged at a position that is different from the design value, the base material thickness sensor 208 detects this deviation, and outputs this deviation to the optical element driving circuit 209. Based on the received deviation, the optical element driving circuit 209 drives the liquid crystal panel 203 to correct the wavefront aberration caused by this deviation. Consequently, a wavefront aberration that corrects the wavefront aberration caused by the deviation of the base material thickness (third-order spherical aberration) is imparted on the light entering the liquid crystal panel 203.

The following is a more detailed explanation of a method for correcting spherical aberration with the liquid crystal panel 203. First, FIG. 15 shows the phase distribution when the base material thickness of the optical disk 210 deviates from the design value (i.e. the optimum base material thickness). FIG. 15 shows the phase distribution for a laser beam wavelength of 405 nm, an NA of the objective lens of 0.85, an optimum base material thickness of the optical disk 210 of 0.1 mm, and a base material thickness deviation of 0.01 mm, illustrating the distribution of the wavefront aberration on the recording layer of the optical disk 210 at the best image point. If a phase correcting this distribution completely is added to the laser beam, then the spot of the laser beam on the optical disk 210 can be constricted to the diffraction limit, even though the base material thickness of the optical disk 210 deviates from the optimum base material thickness.

In order to correct the wavefront aberration in FIG. 15, a phase change canceling the wavefront aberration in FIG. 15 should be imparted on the laser beam. That is to say, the optical path length should be partially changed. With a liquid crystal, the optical path length can be partially changed by changing the voltage applied to the liquid crystal, because its refractive index depends on the voltage applied to it. Consequently, the spherical aberration shown in FIG. 15 can be corrected by applying a suitable voltage to the electrodes 203a to 203d shown in FIG. 14.

However, in the optical head 200, spherical aberration is corrected by generating third-order spherical aberration, so that the effect of correcting spherical aberration is poor when the center of the objective lens 205 deviates from the center of the electrodes 203a to 203d of the liquid crystal panel 203. That is to say, if the objective lens 205 and the liquid crystal panel 203 are arranged in separation from each other, then the center of the objective lens 205 deviates from the center of the electrodes 203a to 203d of the liquid crystal panel 203, due to the shifting of the objective lens 205 in accordance with the eccentricity of the optical disk 210, thus worsening the corrective effect.

FIG. 16 illustrates the relation between the deviation of the center of the objective lens 205 from the center of the electrodes 203a to 203d and the aberration after the correction, when the wavelength of the laser beam is 400 nm, the NA is 0.85, and the base material thickness of the optical disk 210 deviates 10 μm from the design value (0.1 mm).

As shown in FIG. 16, when the center of the objective lens 205 deviates from the center of the electrodes 203a to 203d, the corrective effect deteriorates. This is because, due to the deviation between the centers, the spherical aberration generated by the liquid crystal panel 203 causes coma aberration. In order to prevent deviation of the centers, it is necessary to form the liquid crystal panel 203 in one piece with the objective lens 205.

However, when the liquid crystal panel 203 is formed in one piece with the objective lens 205, it is difficult to make the optical head thinner. Also, since it becomes necessary to shift the liquid crystal panel 203 together with the objective lens 205, the frequency response (sensitivity) of the actuator drops. Moreover, the wiring to drive the liquid crystal panel 203 makes manufacture of the actuator more complex, so that it becomes difficult to lower the costs.

As a method for correcting spherical aberration, it has been proposed to correct spherical aberrations by arranging two lenses on the optical axis and changing the spacing of the lenses (see JP 2000-131603A). In this method, changing the spacing of the lenses imparts a phase change on the light passing through the lenses, which changes parallel light into divergent or convergent light, thus correcting spherical aberration. However, this method necessitates a mechanical means for changing the spacing of the lenses in accordance with the deviation of the base material thickness, which makes miniaturization of the optical head difficult. Moreover, to prevent the occurrence of coma aberration, the centers of the two lenses have to be matched precisely, which makes it difficult to manufacture the optical head at low cost. Furthermore, in this method, the spacing of the lenses is changed on the optical axis, so that the optical system becomes magnifying or contracting. As a result, there is the problem that the transmission efficiency of light that is incident on the lenses for correcting spherical aberration changes, and the rim intensity of the light changes.

The present invention has been developed in view of these problems, and it is a first object of the present invention to provide an optical element with which an optical head can be configured, in which there is little deterioration of the correctional effect when the objective lens shifts, as well as an optical head and an optical recording/reproducing apparatus using such an optical element. It is a second object of the present invention to present a novel optical recording/reproducing apparatus and optical recording/reproducing method.

SUMMARY OF THE INVENTION

In order to achieve these objects, an optical element in accordance with the present invention includes a first voltage application electrode; a first opposing electrode arranged in opposition to the first voltage application electrode; and a first phase changing layer arranged between the first voltage application electrode and the first opposing electrode; wherein, by changing a voltage between the first voltage application electrode and the first opposing electrode, a phase that converts plane waves into spherical waves is imparted on light that is incident on the first phase changing layer. With this optical element, it is possible to configure an optical head, in which there is little deterioration of the corrective effect when the objective lens is shifted.

In the optical element, it is preferable that at least one electrode selected from the first voltage application electrode and the first opposing electrode is arranged on a curved surface. With this configuration, it is not necessary to partition the voltage application electrode, so that wiring becomes easy.

In the optical element, it is preferable that the first phase changing layer is made of a material whose refractive index changes when applying a voltage. With this configuration, it is easy to change the phase of incident light.

In the optical element, it is preferable that the first phase changing layer is made of a liquid crystal. With this configuration, the voltage necessary to change the phase of the incident light can be lowered.

In the optical element, it is preferable that the first phase changing layer is made of a material whose volume changes when subjected to a voltage. With this configuration, it is easy to change the phase of incident light. Furthermore, the phase can be changed independently from the polarization direction.

In the optical element, it is preferable that the first phase changing layer is made of PLZT. With this configuration, the element can be made thin.

In the optical element, it is preferable that the first voltage application electrode includes a plurality of segment electrodes. With this configuration, manufacture becomes easy.

It is preferable that the optical element further includes a second voltage application electrode; a second opposing electrode arranged in opposition to the second voltage application electrode; and a second phase changing layer arranged between the second voltage application electrode and the second opposing electrode; wherein, by changing a voltage between the second voltage application electrode and the second opposing electrode, a phase that converts plane waves into spherical waves is imparted on polarized light that is perpendicular to the polarization direction of the light that is incident on the first phase changing layer. With this configuration, an optical head can be configured in which the corrective effect does not deteriorate when shifting the objective lens in a optical polarization system.

In this optical element, it is preferable that at least one electrode selected from the second voltage application electrode and the second opposing electrode is arranged on a curved surface.

In this optical element, it is preferable that the second phase changing layer is made of a material whose refractive index changes when applying a voltage between the second voltage application electrode and the second opposing electrode.

In this optical element, it is preferable that the second phase changing layer is made of a material whose volume changes when applying a voltage between the second voltage application electrode and the second opposing electrode.

In this optical element, it is preferable that the second voltage application electrode includes a plurality of segment electrodes.

In accordance with the present invention, an optical head for recording or reproducing signals on an optical recording medium includes a light source; an optical element arranged between the optical recording medium and the light source; and an objective lens arranged between the optical recording medium and the optical element; wherein the optical element is the above-described optical element of the present invention. With this optical head, spherical aberration is corrected by the combination of an optical element of the present invention and an objective lens, so that there is little deterioration in the corrective effect when the objective lens shifts. Furthermore, the manufacture of this optical head is easy.

It is preferable that this optical head further includes an N/4 wavelength plate (wherein N is an odd number of one or greater) arranged between the optical element and the objective lens. With this configuration, the utilization efficiency of the light emitted by the light source is high, so that it is easy to record or reproduce signal on the optical recording medium.

In accordance with the present invention, a first optical recording/reproducing apparatus for recording or reproducing signals on an optical recording medium includes an optical head for recording or reproducing signals on an optical recording medium; the optical head including a light source; an optical element arranged between the optical recording medium and the light source; and an objective lens arranged between the optical recording medium and the optical element; wherein the optical element is the above-described optical element of the present invention. This optical recording/reproducing apparatus uses an optical element of the present invention, so that signals can be recorded or reproduced with high reliability. Furthermore, the manufacture of this optical recording/reproducing apparatus is easy.

In accordance with the present invention, a second optical recording/reproducing apparatus for recording or reproducing signals on a first optical recording medium including only one recording layer and on a second optical recording medium including a plurality of recording layers, includes an optical head for recording or reproducing signals on the first and second optical recording media, the optical head including a light source; and a spherical aberration correction means arranged between the optical recording medium and the light source; wherein a distance from a surface of the first optical recording medium to the one recording layer A included in the first optical recording medium is substantially the same as the distance from a surface of the second optical recording medium to one recording layer B included in the second optical recording medium. With this second optical recording/reproducing apparatus, the time until recording or reproducing can be shortened, because it is not necessary to classify the optical recording medium.

In this second optical recording/reproducing apparatus, it is preferable that, in an initial state before recording or reproducing signals on the first or the second optical recording medium, the spherical aberration correction means is driven so as to correct spherical aberration of the recording layer A. With this configuration, focus control and recording or reproducing can be carried out properly for the second optical recording medium.

In the second optical recording/reproducing apparatus, it is preferable that when recording or reproducing signals on a recording layer C of the second optical recording medium that is different from the recording layer B, the spherical aberration correction means is driven so as to correct spherical aberration of that recording layer C.

It is preferable that the second optical recording/reproducing apparatus further includes a focus control means; and that in the initial state, after driving the spherical aberration correction means so as to correct spherical aberration of the recording layer A, focus control is performed with the focus control means.

In the second optical recording/reproducing apparatus, it is preferable that administrative information of the second optical recording medium is stored in the recording layer B.

In accordance with the present invention, a third optical recording/reproducing apparatus for recording or reproducing signals on a first optical recording medium including only one recording layer and on a second optical recording medium including a plurality of recording layers, includes a light source; a spherical aberration correction means arranged between the optical recording medium and the light source; a focus error detection means; and a focus control means; wherein, in an initial state before recording or reproducing signals on the first or the second optical recording medium, the spherical aberration correction means is driven so as to correct spherical aberration of the recording layer included in the first optical recording medium, then, a focus error is detected with the focus error detection means, and focus control is performed with the focus control means, based on the detected focus error. With this third optical recording/reproducing apparatus, the time until recording or reproducing can be shortened, because it is not necessary to classify the optical recording medium.

In accordance with the present invention, a fourth optical recording/reproducing apparatus for recording or reproducing signals on a first optical recording medium including only one recording layer and on a second optical recording medium including a plurality of recording layers, includes a light source; a spherical aberration correction means arranged between the optical recording medium and the light source; a focus error detection means; and a focus control means; wherein, if it is known whether the optical recording medium subjected to recording or reproducing is a first optical recording medium or a second optical recording medium, then the spherical aberration correction means is driven so as to correct spherical aberration at a standard base material thickness of the recording layer subjected to recording or reproducing, then, a focus error is detected with the focus error detection means, and focus control is performed with the focus control means, based on the detected focus error. With this fourth optical recording/reproducing apparatus, smooth focus control becomes possible. It should be noted that "standard base material thickness" means the design value of the base material thickness.

In accordance with the present invention, in a first recording/reproducing method for recording or reproducing signals with an optical recording/reproducing apparatus on a first optical recording medium including only one recording layer and on a second optical recording medium including a plurality of recording layers, the optical recording/reproducing apparatus includes a spherical aberration correction means; a distance from a surface of the first optical recording medium to the one recording layer A included in the first optical recording medium is substantially the same as the distance from a surface of the second optical recording medium to one recording layer B included in the second optical recording medium; and the method includes a first step of driving the spherical aberration correction means so as to correct spherical aberration of the recording layer A.

It is preferable that this first recording/reproducing method further includes a second step, carried out after the first step, wherein, when recording or reproducing signals on a recording layer C of the second optical recording medium that is different from the recording layer B, the spherical aberration correction means is driven so as to correct spherical aberration of that recording layer C.

In accordance with the present invention, in a second optical recording/reproducing method for recording or reproducing signals with an optical recording/reproducing apparatus on a first optical recording medium including only one recording layer and on a second optical recording medium including a plurality of recording layers, the optical recording/reproducing apparatus includes a spherical aberration correction means, a focus error detection means, and a focus control means; and the method includes a first step of driving the spherical aberration correction means so as to correct spherical aberration of the recording layer included in the first optical recording medium; a second step of detecting a focus error with the focus error detection means;

and a third step of performing focus control with the focus control means, based on the detected focus error; wherein the first, second and third step are carried out before recording or reproducing. With this second optical recording/reproducing method, the time until recording or reproducing can be shortened, because it is not necessary to classify the optical recording medium.

In accordance with the present invention, in a third optical recording/reproducing method for recording or reproducing signals with an optical recording/reproducing apparatus on a first optical recording medium including only one recording layer and on a second optical recording medium including a plurality of recording layers, the optical recording/reproducing apparatus includes a spherical aberration correction means, a focus error detection means, and a focus control means; and the method includes a first step of acquiring information about whether the optical recording medium subjected to recording or reproducing is a first optical recording medium or a second optical recording medium; a second step of driving the spherical aberration correction means so as to correct spherical aberration at a standard base material thickness of the recording layer subjected to recording or reproducing, based on that information; a third step of detecting a focus error with the focus error detection means; and a fourth step of performing focus control with the focus control means, based on the detected focus error; wherein the first, second, third, and fourth step are carried out before recording or reproducing. With this third optical recording/reproducing method, smooth focus control becomes possible.

DESCRIPTION OF THE PREFERRED EMBODIMENTS

Embodiments of the present invention are explained below with reference to the drawings. Note that similar parts are marked by identical numbers and redundant explanations have been omitted.

Embodiment 1

Figure 1:
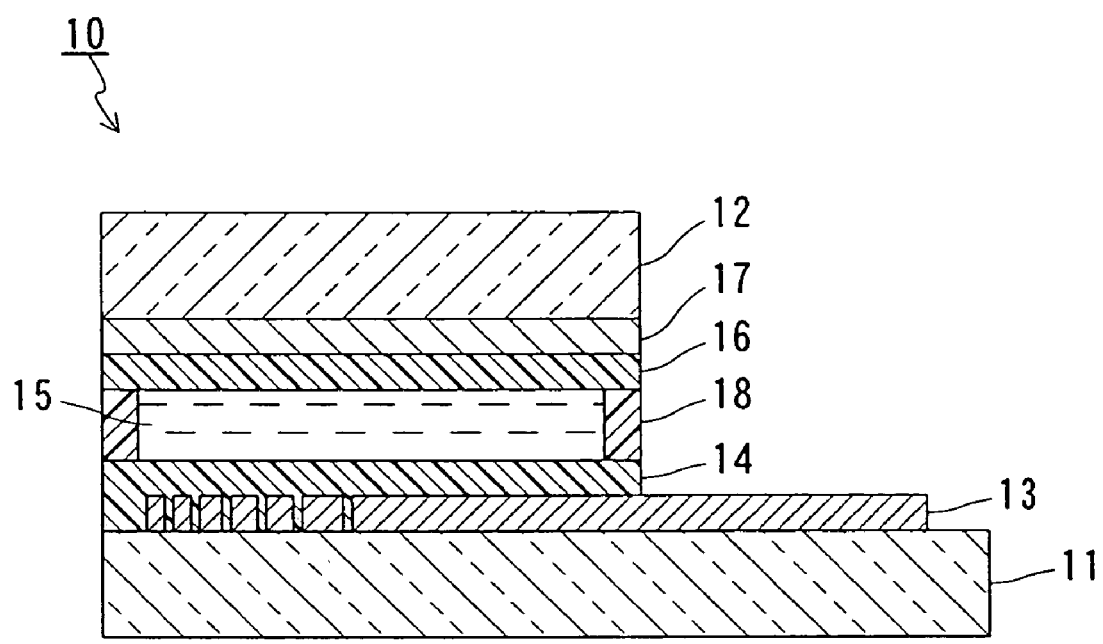
FIG. 1 is a cross-sectional view showing an example of an optical element of the present invention.

In Embodiment 1, an example of an optical element of the present invention is described. FIG. 1 shows a schematic cross-section of an optical element 10 of Embodiment 1.

Referring to FIG. 1, the optical element 10 is provided with a first substrate 11, a second substrate 12 disposed substantially parallel to the first substrate 11, a voltage application electrode 13 (first voltage application electrode) disposed between the first substrate 11 and the second substrate 12, a translucent resin film 14, a liquid crystal 15 (first phase changing layer), a translucent resin film 16, an opposing electrode 17 (first opposing electrode), and a sealing resin 18. The liquid crystal 15 is sealed by the sealing resin 18.

The first substrate 11 and the second substrate 12 are translucent substrates made from glass, for example.

Figure 2:
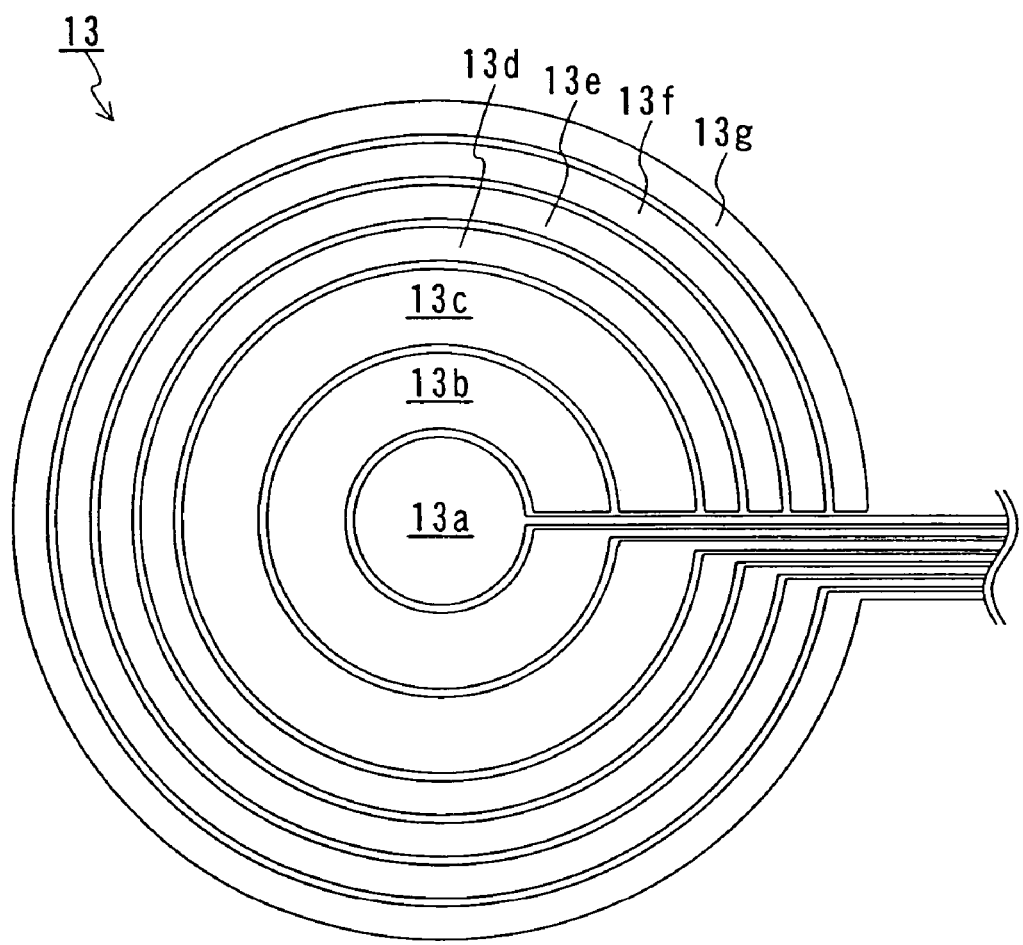
FIG. 2 is a top view showing an example of a voltage application electrode in an optical element of the present invention.

The voltage application electrode 13 applies a predetermined voltage to the liquid crystal 15. The voltage application electrode 13 is formed on the primary surface of the inner side (liquid crystal 15 side) of the first substrate 11. The voltage application electrode 13 is made from a translucent, conductive material, such as indium tin oxide (ITO). FIG. 2 shows a top view of the voltage application electrode 13. The voltage application electrode 13 includes a plurality of segment electrodes 13a to 13g disposed in concentric circles. Note that in FIG. 2 the voltage application electrode 13 is shown as made up of seven segment electrodes 13a to 13g, but there is no particular limitation with regard to the number of the segment electrodes.

The opposing electrode 17 is formed on the second substrate 12 such that it opposes the voltage application electrode 13. Together with the voltage application electrode 13, the opposing electrode applies a predetermined voltage to the liquid crystal 15. The opposing electrode 17 is made from a translucent, conductive material, such as ITO. The opposing electrode 17 is formed at least on the entire surface of those parts of the primary surface on the inner side (liquid crystal 15 side) of the second substrate 12 that oppose the segment electrodes 13a to 13g.

The translucent resin films 14 and 16 are alignment films for aligning the liquid crystal 15 in a predetermined direction, and are made of, for example, polyvinyl alcohol films. By rubbing the translucent resin film 14 or 16, the liquid crystal 15 can be aligned in a predetermined direction.

The liquid crystal 15 functions as a phase changing layer that changes the phase of incident light. The liquid crystal 15 is made of, for example, a nematic liquid crystal. By changing the voltage between the voltage application electrode 13 and the opposing electrode 17, the refractive index of the liquid crystal 15 can be changed, and this makes it possible to change the phase of the incident light.

The sealing resin 18 is for sealing the liquid crystal 15, and is made from an epoxy resin, for example.

In the optical element 10, by changing the voltage between each of the segment electrodes 13a to 13g and the opposing electrode 17, the refractive index of the liquid crystal 15, which is a phase changing layer, is partially changed, and a phase that converts plane waves into spherical waves is imparted on the light entering the liquid crystal 15. More specifically, as an example, a voltage of 0V can be applied to the opposing electrode, 0V to the segment electrode 13a, 0.5V to the segment electrode 13b, 1V to the segment electrode 13c, 1.5V to the segment electrode 13d, 2V to the segment electrode 13e, 2.5V to the segment electrode 13f, and 3V to the segment electrode 13g. In this way, by increasing the voltage applied to the segment electrodes from the center of the voltage application electrode 13 outward, the phase difference increases when progressing outward from the center of the optical element 10, and it becomes possible to convert plane waves into spherical waves. With the optical element 10, as is explained in Embodiment 2, an optical head can be configured in which the corrective effect is not lowered when shifting the objective lens.

Figure 3:
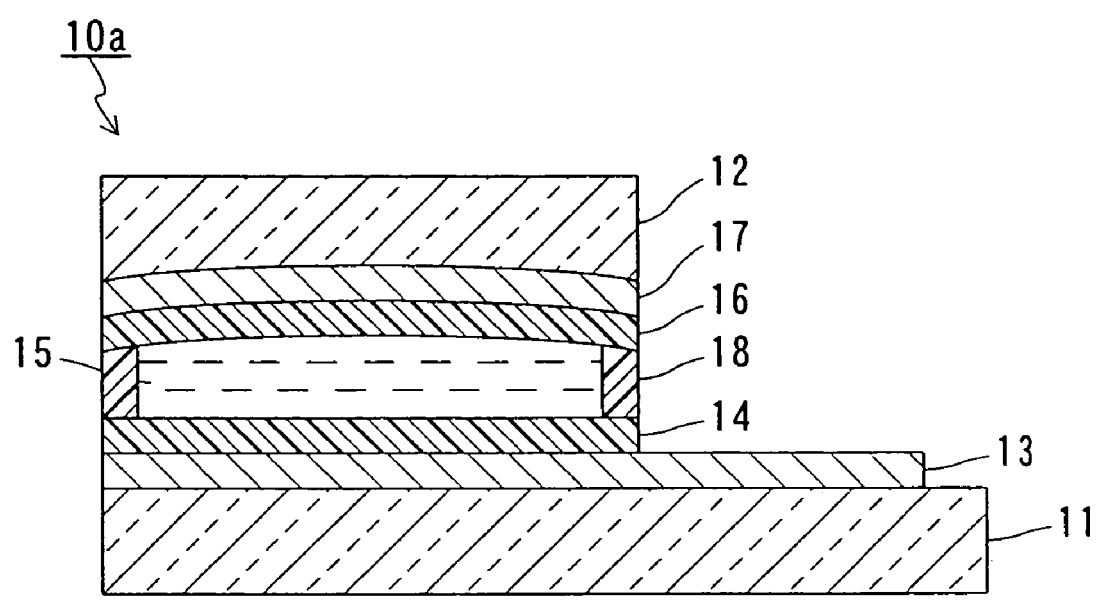
FIG. 3 is a cross-sectional view showing another example of an optical element of the present invention.

At least one electrode chosen from the voltage application electrode 13 and the opposing electrode 17 can be disposed on a curved surface (the same applies for the embodiments below as well). FIG. 3 shows a schematic cross-section of an optical element 10a, in which the opposing electrode 17 is disposed on the curved surface. In the optical element 10a, the inner surface of the second substrate 12 is concave, and the opposing electrode 17 is formed on the surface thereof. In the optical element 10a, the voltage application electrode 13 is not divided up into a plurality of segment electrodes, but is formed as a single surface. As explained in Embodiment 2, this enables the configuration of an optical head in which corrective effects do not particularly decline even if the objective lens moves.

JP2001-143303A discloses another example of an optical element imparting a smooth phase change. This optical element includes a voltage application electrode made of a transparent electrode with a large sheet resistance and a voltage supply potion with a resistance that is lower than that of the transparent electrode. When a voltage is applied from the outside to the voltage supply potion connected to a potion of the transparent electrode, a voltage drop occurs, because the sheet resistance of the transparent electrode is large, and the voltage decreases smoothly with increasing distance from the voltage supply potion. Thus, the voltage between the voltage application electrode and the opposing electrode changes smoothly, and accordingly the refractive index of the phase changing layer changes smoothly as well. Additionally, methods other than rubbing may be used to control the alignment of the liquid crystal 15 (the same applies for the other embodiments below as well). For example, the films themselves may be given an alignment by using oblique vapor deposition. Additionally, it is also possible to control the alignment of the liquid crystal by forming grooves in the substrate.

Furthermore, it is also possible to use another material instead of the liquid crystal 15 to form the phase changing layer (the same applies for embodiments below as well). For the phase changing layer, it is possible to use material whose refractive index or a material whose volume changes with the voltage between the voltage application electrode 13 and the opposing electrode 17. As a material whose volume changes with voltage, it is possible to use PLZT (a transparent crystal of a perovskite structure that includes lead oxide, lanthanum, zirconium oxide, and titanium oxide). PLZT is a solid, so unlike liquid crystals is does not require a substrate or sealing resin film. For this reason, using PLZT allows making the optical element thinner.

Embodiment 2

Figure 5:
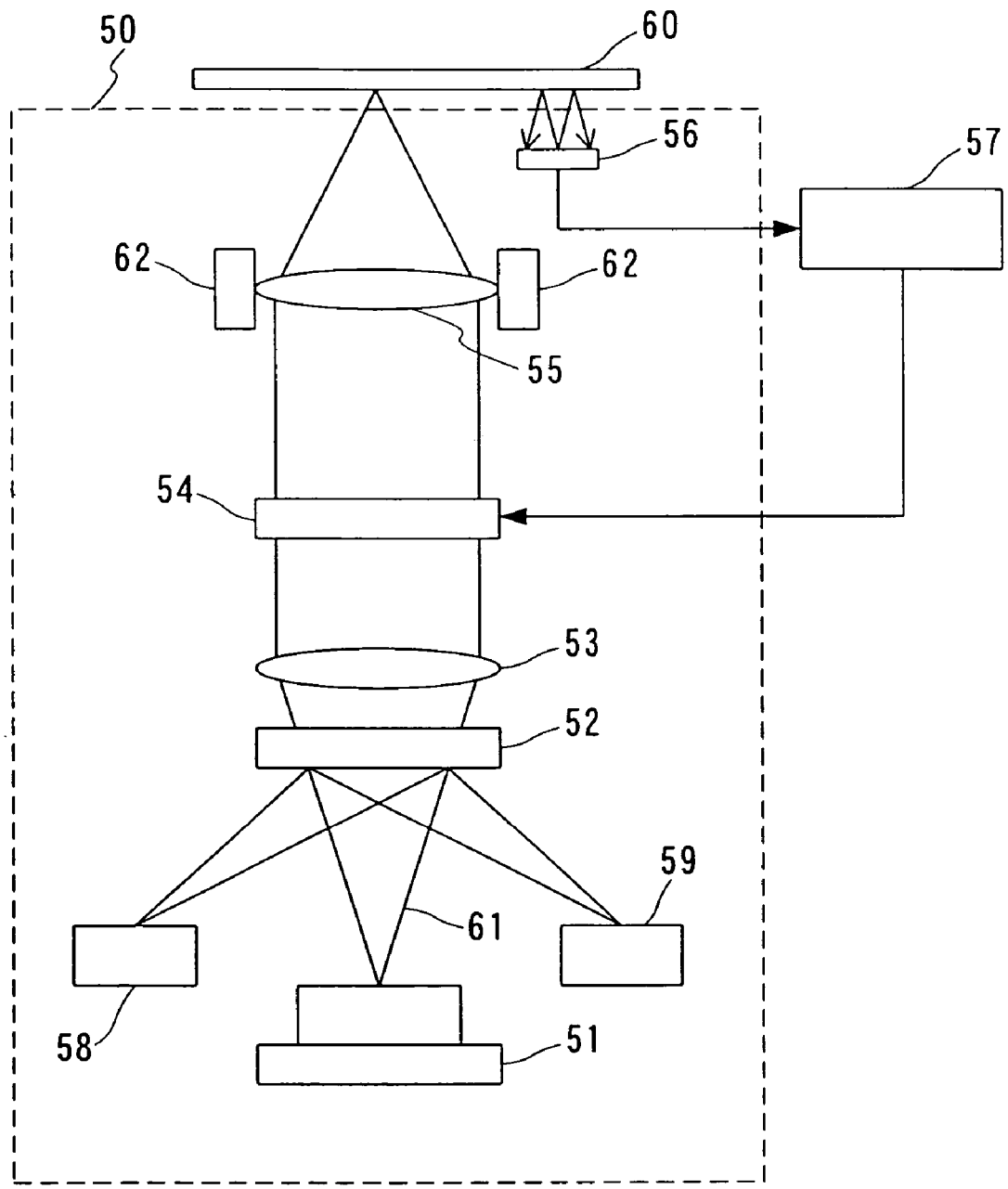
FIG. 5 schematically illustrates the configuration of an example of an optical head of the present invention.

Embodiment 2 describes an optical head of the present invention, which uses the optical element described in Embodiment 1. FIG. 5 schematically shows the configuration of an optical head 50 of Embodiment 2.

Referring to FIG. 5, the optical head 50 is provided with a light source 51, a diffraction grating 52, a collimating lens 53, an optical element 54, an objective lens 55, a base material thickness sensor 56, a first photodetector 58, and a second photodetector 59. The optical element 54 is driven by an optical element driving circuit 57. The collimating lens 53 and the objective lens 55 form an optical focusing system. The optical head 50 records or reproduces a signal on an optical recording medium 60. The optical element 54 is an optical element as described in Embodiment 1.

For the light source 51, it is possible to use a semiconductor laser element. The light source 51 outputs a laser beam 61 (coherent light) for recording and reproducing toward the recording layer of the optical recording medium 60. The diffraction grating 52 has a zero-order diffraction efficiency of approximately 50%, and a ±first-order diffraction efficiency of approximately 50%. The diffraction grating 52 can be formed by using photolithography to form a predetermined resist pattern on a glass surface, after which the glass is etched. The optical element 54 imparts on the light entering the optical element 54 a phase that converts plane waves into spherical waves. For the first photodetector 58 and the second photodetector 59, it is possible to use photodiodes.

The objective lens 55 focuses the laser beam 61 on the recording layer of the optical recording medium 60. The first photodetector 58 receives the +1 order light that has been diffracted by the diffraction grating 52 from the laser beam 61 reflected by the recording layer of the optical recording medium 60, and converts this light into an electric signal. The second photodetector 59 receives the −1 order light diffracted by the diffraction grating 52 from the laser beam 61 reflected by the recording layer of the optical recording medium 60, and converts this light into an electric signal.

The base material thickness sensor 56 detects deviations between the previously set base material thickness and the actual base material thickness, and outputs a signal depending on that deviation. For the base material thickness sensor 56, the sensors described in JP H10-334575A and U.S. Pat. No. 6,115,336 can be used, for example. The base material thickness sensor 56 specifically includes a light source, a first optical system that irradiates the optical recording medium (measurement object) with the light emitted from the light source, and a second optical system that guides light reflected from the optical recording medium into a light receiving element. This light source is made from a laser, LED, or a lamp. The first and second optical systems are made of convex lenses or a combination of convex lenses and concave lenses. With this configuration, the signal outputted from the light receiving element depends on the base material thickness. Additionally, JP 2000-171346A describes another separate method for detecting the base material thickness. In this method, spherical aberrations are detected based on the focusing position of a first light beam on the side near the optical axis of the light reflected from the optical recording medium, and the focusing position of a second light beam further outward than the first light beam.

The optical element driving circuit 57 drives the optical element 54 such that it corrects deviations in the base material thickness based on the base material thickness deviation inputted by the base material thickness sensor 56.

The operation of the optical head 50 shall be explained with reference to FIG. 5. A portion of the linear polarized light emitted from the light source 51 passes through the diffraction grating 52 and enters the collimating lens 53, which turns it into parallel light. This parallel light enters the optical element 54. When there is a deviation between the design value and the base material thickness of the optical recording medium 60, the base material thickness sensor 56 outputs a signal in accordance with the amount of that deviation, and the signal is inputted to the optical element driving circuit 57. Based on the inputted signal, the optical element driving circuit 57 outputs to the optical element 54 a signal that is necessary to correct the wavefront aberration that occurs when there is a deviation in the base material thickness of the optical recording medium 60. By doing this, a wavefront aberration, which imparts a phase (power component) that converts the parallel light into divergent light, or a phase that converts the parallel light into convergent light, is imparted on the light that enters the optical element 54, depending on the sign of the deviation of the base material thickness.

Light that has passed through the optical element 54 enters the objective lens 55 as non-parallel light, thereby causing spherical aberration. This spherical aberration corrects the spherical aberration caused by deviations between the base material thickness of the optical recording medium 60 and the design value. That is to say, the optical element 54 imparts a phase on the incident light such that a desired spherical aberration occurs when it enters the objective lens 55. This forms a light spot on the optical recording medium 60 without aberration, that is, focused to the diffraction limit.

Next, the light reflected from the optical recording medium 60 turns into light that contains the wavefront aberration caused when there is a deviation between the base material thickness of the optical recording medium 60 and the design value, but the wavefront aberration is corrected by the objective lens 55 and the optical element 54. The light that has passed through the optical element 54 then passes through the collimating lens 53, and is diffracted by the diffraction grating 52. After this, diffracted +1 order light is irradiated onto the first photodetector 58, and diffracted −1 order light is irradiated onto the second photodetector 59. The first photodetector 58 outputs a focus error signal, which indicates the focusing condition of the light on the optical recording medium 60, and a tracking error signal, which indicates the irradiation position of the light. The second photodetector 59 outputs a signal regarding information recorded on the optical recording medium 60.

The focus error signal outputted from the first photodetector 58 is inputted to a focus control circuit, which is not shown in the drawings. The focus control circuit controls the position of the objective lens 55 in the direction of the optical axis, based on the focus error signal, such that light is focused on the optical recording medium 60 in a state of focus. Furthermore, the tracking error signal is inputted to a tracking control circuit, which is not shown in the drawings. The tracking control circuit controls the position of the objective lens 55, based on the tracking error signal, such that it focuses the light on the desired track of the optical recording medium 60. The position of the objective lens 55 is controlled with actuators 62.

Next, the operation of the optical element 54 is explained with an example of how the optical element 10 is used. In the optical element 10, the refractive index of the liquid crystal 15, which is a phase changing layer, is changed by changing the voltage between each of the segment electrodes 13a to 13g and the opposing electrode 17, and a phase that converts plane waves into spherical waves is imparted on the light entering the liquid crystal 15. In order to convert the plane waves into spherical waves, a phase P that satisfies the following equation (1) should be imparted on the incident light.

$$(a-P)^2 + r^2 = a^2 \qquad (1)$$

Figure 4:
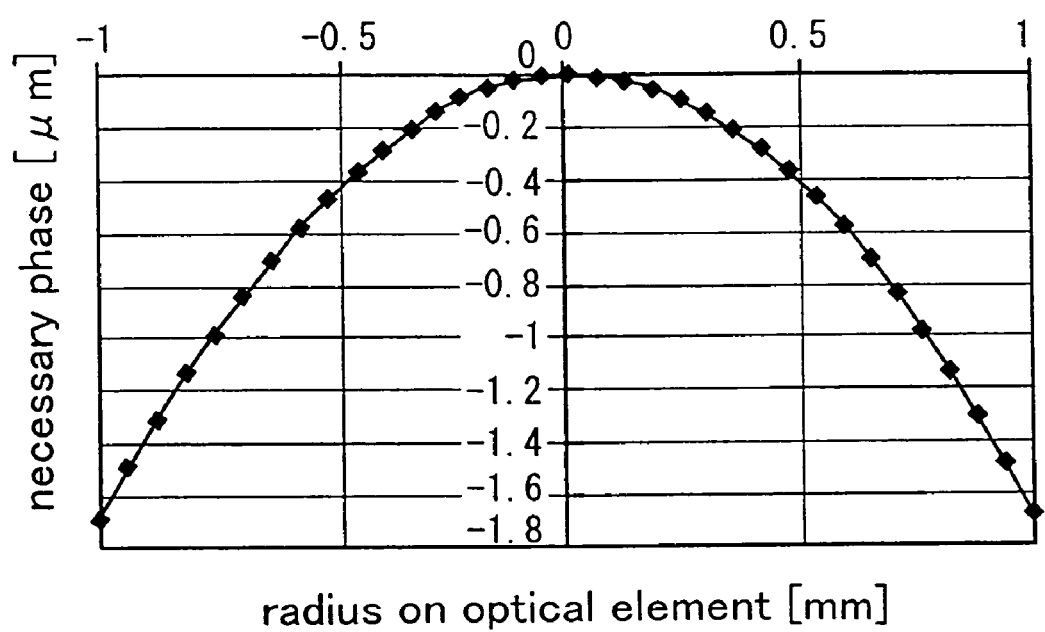
FIG. 4 is a graph showing an example of the relationship between the distance from the optical axis and the phase necessary to correct spherical aberration.

Here, a is a constant, and r is the distance from the center of the optical axis. FIG. 4 shows one example of a phase distribution that satisfies equation (1) when the wavelength of the laser beam is 405 nm, the NA is 0.85, the design value of the base material thickness (that is, the optimum base material thickness) is 0.1 mm, and the deviation of the base material thickness from the design value is 10 μm.

Figure 6:
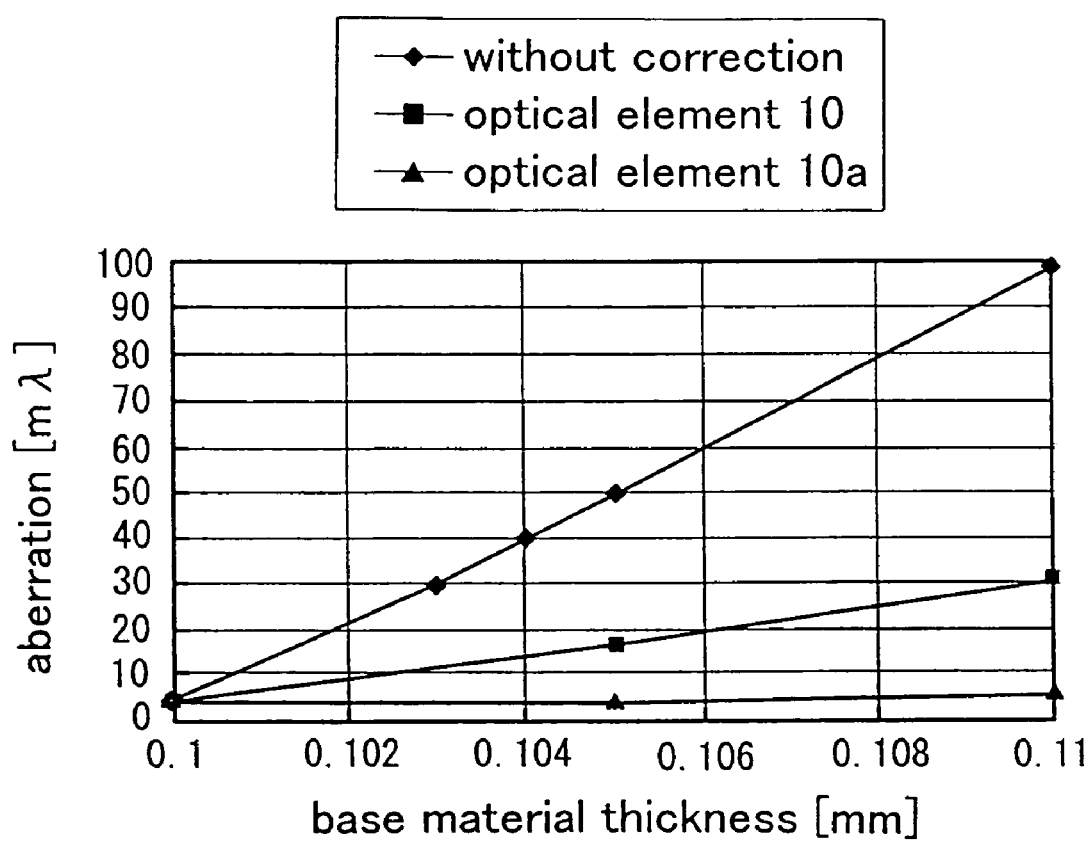
FIG. 6 is a graph showing an example of the relationship between the base material thickness and the aberration.
Figure 7:
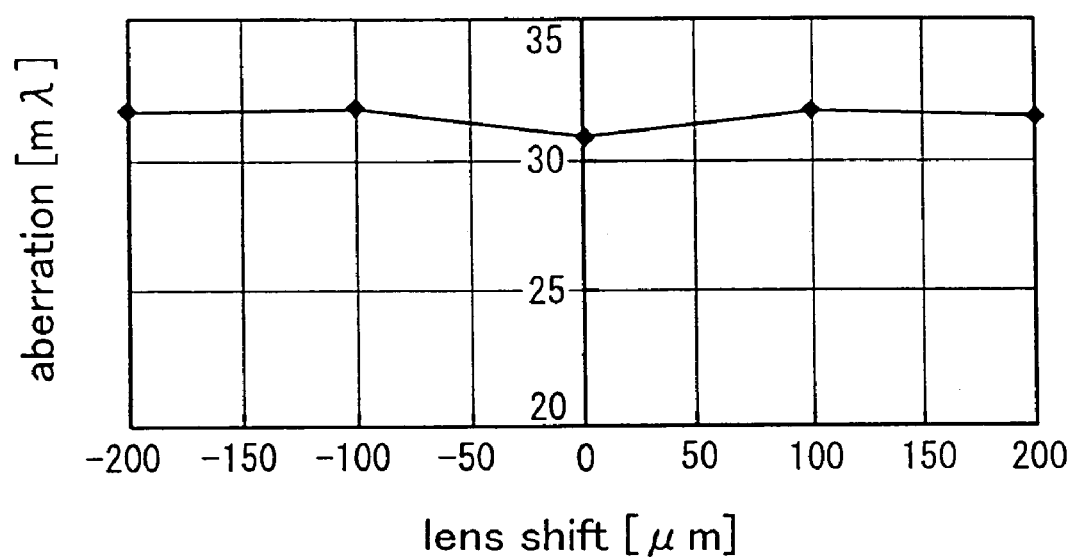
FIG. 7 is a graph showing an example of the relationship between the lens shift and the aberration.

FIG. 6 shows the relationship between the base material thickness and the aberration after correction, when a segment electrode with forty concentric circles generates the phase shown in FIG. 4. For comparison, FIG. 6 also shows the aberration when no correction is carried out. FIG. 7 shows lens shift properties when a deviation in base material thickness of 10 μm is corrected. The horizontal axis in FIG. 7 marks the deviation (lens shift) between the center of the optical axis and the center of the objective lens (which corresponds to the deviation between the center of the segment electrode with forty concentric circles and the center of the objective lens).

In the optical head 50, a phase (power component) converting plane waves into spherical waves is imparted on the light that has entered the optical element 54, and together with the objective lens causes spherical aberration, thereby achieving correction. Consequently, this is different from directly imparting on the light that has entered the optical element the third-order spherical aberrations that should be corrected, and as shown in FIG. 7, the optical head 50 becomes extremely resistant against lens shifts.

As disclosed in JP H10-360545A, for the optical element 54, it is possible to use an arrangement of forming thin film resistances on the optical element to voltage divide the signal applied from the outside, and applying these divided voltages to the respective segment electrodes. With this arrangement, even with a high number of segment electrodes like forty, the voltage applied from outside can be split three ways, including the voltage applied to the opposing electrode.

Figure 8:
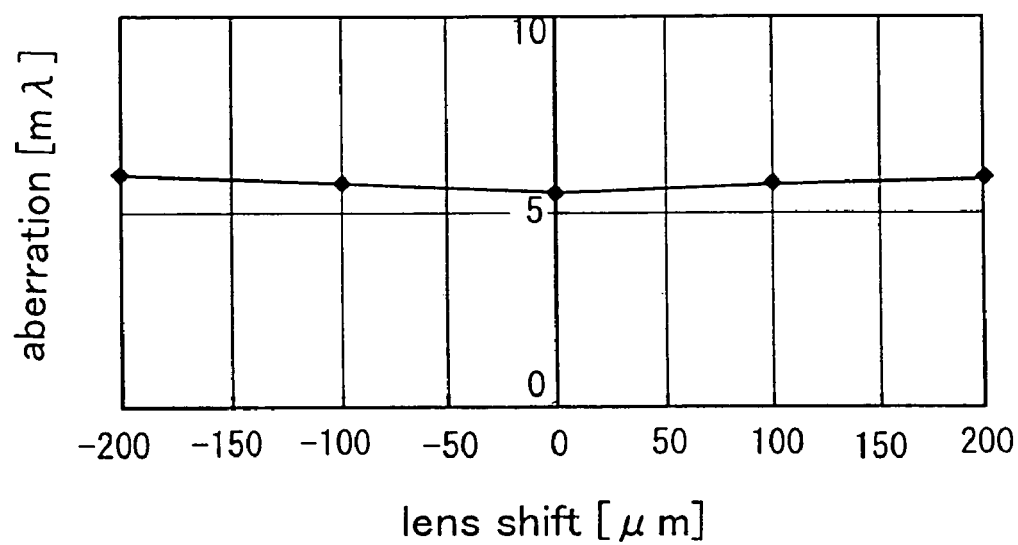
FIG. 8 is a graph showing another example of the relationship between the lens shift and the aberration.

When using the optical element 10, the necessary phases can be generated in approximation to the plurality of segment electrodes. On the other hand, by using an optical element 10a it is possible to generate necessary phases according to their actual shape. In the optical element 10a, the liquid crystal 15, which is a phase changing layer, is formed to be convex, so that it is possible to impart a continuously changing phase on the incident light without partitioning the voltage application electrode. Consequently, by using the optical element 10a, it is possible to reproduce the power components with fidelity. In this case, it is possible to reduce the aberration after correction to substantially zero, because no high-order aberrations are caused. FIG. 6 shows the relationship between the base material thickness and the aberration after correction, when the optical element 10a is used. FIG. 8 shows the lens shift properties when a deviation in the base material thickness of 10 μm is corrected with the optical element 10a. Also in this case, the lens shift properties are extremely favorable, as with the approximate correction by the segment electrodes:

As explained above, the optical head 50 of Embodiment 2 has favorable lens shift properties when correcting spherical aberrations. Moreover, the objective lens and the optical element can be disposed without being formed in one piece, so that with the optical head 50, it is possible to read with high reliability signals recorded on an optical recording medium having a deviation in the base material thickness. Also, the optical head 50 can be made even thinner. Also, because the optical element need not be installed in the actuator, it is possible to prevent a drop in the frequency response (sensitivity) of the actuator, and to manufacture at low costs and with simplified wiring. Furthermore, the optical head 50 generates the power components electrically, in contrast to a conventional optical head that includes two lenses and mechanically changes the spacing between the lenses to generate the power components with the optical head 50. Therefore, the optical head 50 is suitable for miniaturization. Furthermore, with the optical head 50 it is possible to prevent changes in the rim intensity of the light, because the transmission efficiency of light that has entered the optical element does not change.

Embodiment 3

Embodiment 3 describes another example of the optical element and optical head of the present invention. The optical head of Embodiment 3 differs from the optical head of Embodiment 2 in that it uses an optical polarization system, which includes a polarized holographic optical element and a λ/4 plate, and in that it uses an optical element adapted to the optical polarization system. Unless explained otherwise, parts given the same numerals as parts explained in Embodiment 1 and Embodiment 2 have similar functions to the parts described in Embodiment 1 and Embodiment 2.

Figure 9:
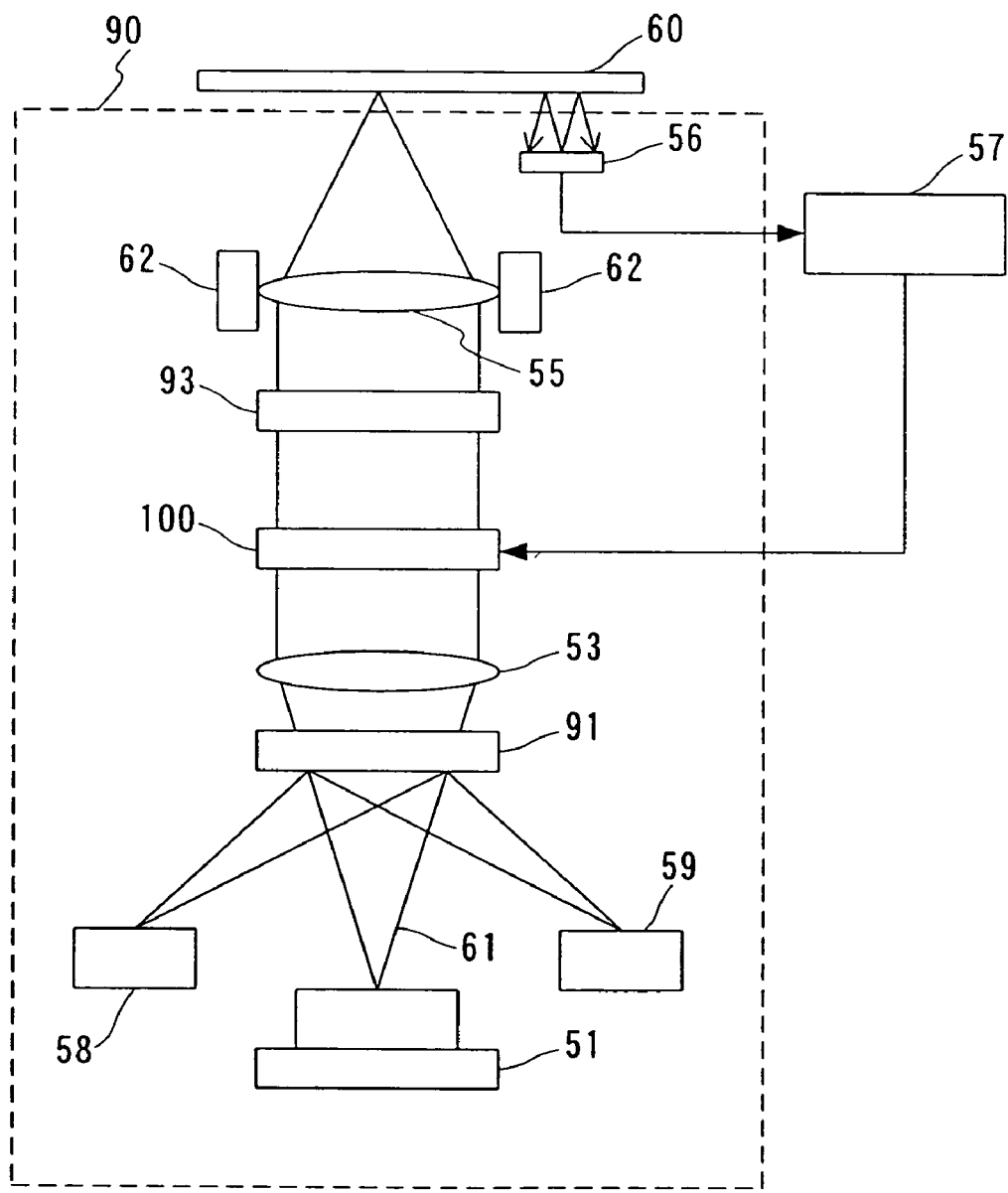
FIG. 9 schematically illustrates another example of an optical head of the present invention.

FIG. 9 schematically shows the configuration of an optical head 90 of Embodiment 3. Referring to FIG. 9, the optical head 90 includes a light source 51, a collimating lens 53, an objective lens 55, a base material thickness sensor 56, a first photodetector 58, a second photodetector 59, a polarized holographic optical element 91, an optical element 100, and a λ/4 plate 93. The optical element 100 is driven by the optical element driving circuit 57.

The polarized holographic optical element 91 has the function of separating the polarized light. The polarized holographic optical element 91 acts on ordinary light rays as a diffraction grating, but does not act on extraordinary light rays (approximately 100% transmissivity). For the polarized holographic optical element 91, it is possible to use the hologram disclosed in JP H6-27322A. This polarized holographic optical element can be formed by proton exchanging a predetermined portion of a birefringent lithium niobate substrate, and then etching the proton exchanged portions.

The optical element 100 corrects aberrations by changing the refractive index of the liquid crystal. Further details regarding the optical element 100 will be explained later.

The λ/4 plate 93 is made of a quartz, for example. The λ/4 plate 93 is a non-linear optical element that converts linearly polarized light, emitted from the light source 51, into circularly polarized light, and converts light reflected by the recording layer of the optical recording medium 60 into linearly polarized light with a polarization direction that is different from that of when it was irradiated. It is also possible to use an N/4 plate (N being an odd number greater than one) instead of the λ/4 plate.

Next, the operation of the optical head 90 is explained with reference to FIG. 9. Linearly polarized light (the laser beam 61) emitted from the light source 51 passes through the polarized holographic optical element 91 with a transmission efficiency of approximately 100% and enters the collimating lens 53, which turns it into parallel light. This parallel light enters the optical element 100.

At this point, when there is a deviation between the design value and the actual base material thickness of the optical recording medium 60, the base material thickness sensor 56 outputs a signal corresponding to that deviation, and this signal is inputted into the optical element driving circuit 57. Based on the inputted signal, the optical element driving circuit 57 outputs a signal to the optical element 100 that is necessary to correct the wavefront aberration generated when the actual base material thickness of the optical recording medium 60 deviates from the design value. The light that enters the optical element 100 is imparted with a wavefront aberration based on the signal outputted by the optical element driving circuit 57. More specifically, depending on the sign of the deviation of the base material thickness, a wavefront aberration is imparted such that a phase (power component) that converts parallel light into divergent light, or a phase that converts parallel light into convergent light, is imparted.

Next, light that has passed through the optical element 100 enters the λ/4 plate 93, and is converted from linearly polarized light into circularly polarized light. Because this circularly polarized light enters the objective lens 55 in a non-parallel state, spherical aberration is caused by the objective lens 55, and this spherical aberration corrects the spherical aberration generated by a deviation in the base material thickness of the optical recording medium 60. Consequently, a light spot is formed on the optical recording medium 60 that is without aberration, that is to say, has been constricted to the diffraction limit.

Light that enters the optical recording medium 60 is reflected by the optical recording medium 60, and becomes light with a wavefront aberration that is caused when there is a deviation in the base material thickness of the optical recording medium 60. This light passes through the objective lens 55 and enters the λ/4 plate 93. Light that has entered the λ/4 plate 93 is converted from circularly polarized light into linearly polarized light. The polarization direction of the linearly polarized light is perpendicular with respect to the linearly polarized light emitted from the light source 51. This linearly polarized light, which has spherical aberration, enters the optical element 100 of the present invention, and its spherical aberration is corrected by imparting a same power component as on the incoming light path.

The linearly polarized light that has passed through the optical element 100 is diffracted approximately 100% by the polarized holographic optical element 91, and the +1 order light of the diffraction enters the first photodetector 58, whereas the −1 order light of the diffraction enters the second photodetector 59. The first photodetector 58 outputs a focus error signal, which indicates the focusing condition of the light on the optical recording medium 60, and a tracking error signal, which indicates the irradiation position of the light. The second photodetector 59 outputs a signal regarding information recorded on the optical recording medium 60.

The focus error signal outputted from the first photodetector 58 is given to a focus control circuit, which is not shown in the drawings. The focus control circuit controls the position of the objective lens 55 in the direction of the optical axis, based on the focus error signal, such that light is focused on the optical recording medium 60 in a state of focus. Furthermore, the tracking error signal is given to a tracking control circuit, which is not shown in the drawings. The tracking control circuit controls the position of the objective lens 55, based on the tracking error signal, such that it focuses the light on the desired track of the optical recording medium 60. The position of the objective lens 55 is controlled using actuators 62.

Because an optical polarization system is used in the optical head 90, the usage efficiency of the light that is emitted by the light source 51 is high, and recording/reproducing of rewritable optical recording media becomes easy.

The following is an explanation of the optical element 100 of the present invention. Liquid crystals are uniaxially birefringent materials, so that phase changes can be imparted on incident light only when the rubbing direction of the liquid crystal is parallel to the polarization direction of the light. If the polarization directions for the incoming light path and the returning light path are perpendicular, as in an optical polarization system, then it is not possible to impart a phase change in the returning light path with the optical element of the Embodiment 1. In the optical head of the present invention, which carries out the correction with a combination of an optical element that defocuses the incident light and an objective lens, there is the problem that if the same phase change is not imparted in the incoming light path and the returning light path, then the light on the photodetectors is defocused. Thus, in order to impart the same phase change on the polarized returning light as well, an optical element that is adapted to optical polarization systems has to be used for the optical head of the Embodiment 3.

Figure 10:
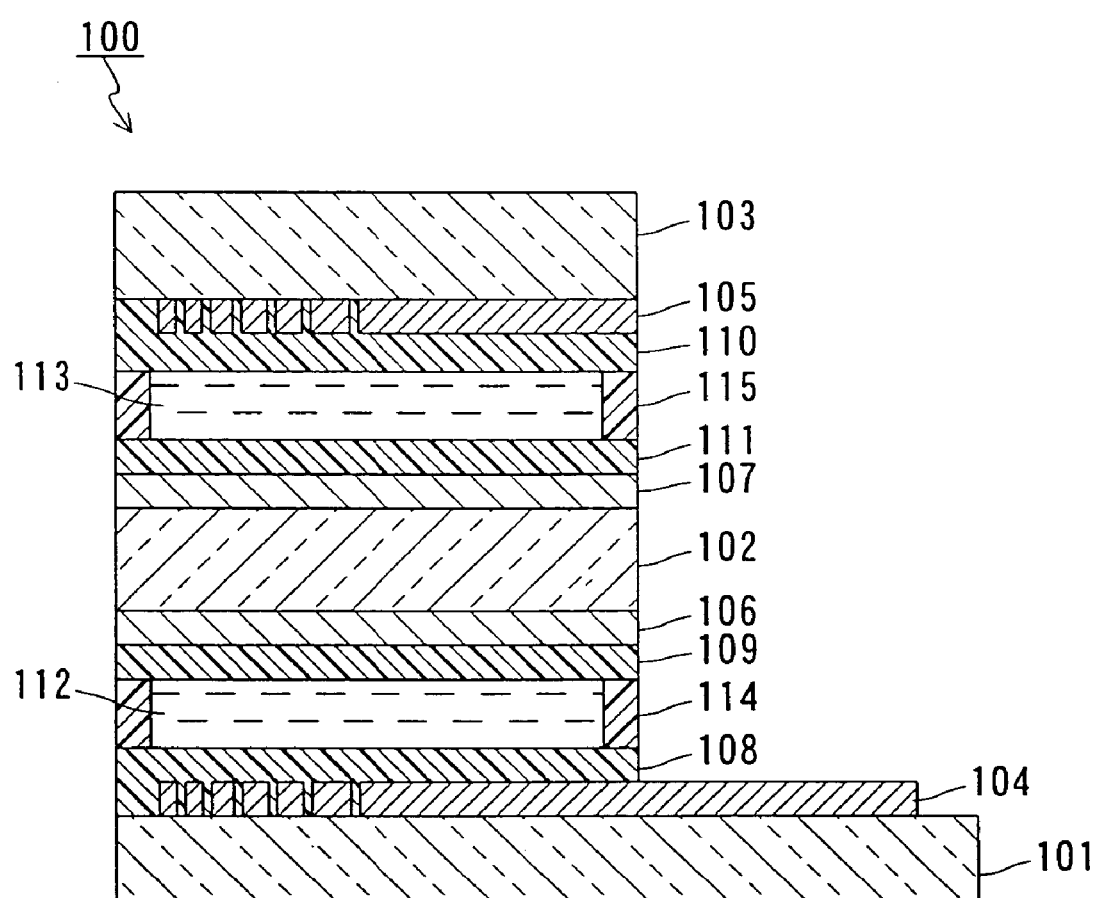
FIG. 10 is a cross-sectional view showing another example of an optical element of the present invention.

The following is a description of the optical element 100. FIG. 10 shows a schematic cross-sectional view of the optical element 100. The optical element 100 includes a first substrate 101, a second substrate 102, a third substrate 103, a first voltage application electrode 104, a second voltage application electrode 105, a first opposing electrode 106, a second opposing electrode 107, a first translucent resin film 108, a second translucent resin film 109, a third translucent resin film 110, a fourth translucent resin film 111, a first liquid crystal 112, a second liquid crystal 113, a first sealing resin 114, and a second sealing resin 115.

The first, second and third substrates 101, 102 and 103 are arranged substantially parallel with respect to one another. These substrates are translucent, and made of glass, for example.

The first voltage application electrode 104 is disposed between the first substrate 101 and the first liquid crystal 112. The first voltage application electrode 104 is for applying a desired voltage to the first liquid crystal 112. The first voltage application electrode 104 is formed on the principal surface on the inner side (liquid crystal 112 side) of the first substrate 101.

The second voltage application electrode 105 is disposed between the third substrate 103 and the second liquid crystal 113. The second voltage application electrode 105 is for applying a desired voltage to the second liquid crystal 113. The second voltage application electrode 105 is formed on the principal surface on the inner side (liquid crystal 113 side) of the third substrate 103.

The first and the second voltage application electrodes 104 and 105 include a plurality of segment electrodes, as shown in FIG. 2. It should be noted that if the voltage application electrodes or the opposing electrodes are formed on curved surfaces as shown in FIG. 3, they are formed continuously.

The first opposing electrode 106 is arranged substantially parallel to the first voltage application electrode 104. Together with the first voltage application electrode 104, the first opposing electrode 106 applies a desired voltage to the first liquid crystal 112. The first opposing electrode 106 is formed substantially uniformly on at least that part of the principal surface of the second substrate 102 on the side of the second liquid crystal 112 that is in opposition to the segment electrodes.

The second opposing electrode 107 is arranged substantially parallel to the second voltage application electrode 105. Together with the second voltage application electrode 105, the second opposing electrode 107 applies a desired voltage to the second liquid crystal 113. The second opposing electrode 107 is formed substantially uniformly on at least that part of the principal surface of the second substrate 102 on the side of the second liquid crystal 113 that is in opposition to the segment electrodes.

The first and the second translucent resin films 108 and 109 are formed covering the first voltage application electrode 104 and the first opposing electrode 106, respectively. The first and the second translucent resin films 108 and 109 are alignment films for aligning the first liquid crystal 112 into a predetermined direction, and are made, for example, of polyvinyl alcohol films. By rubbing the first and the second translucent resin films 108 and 109, the first liquid crystal 112 can be aligned in a predetermined direction.

The third and the fourth translucent resin films 110 and 111 are formed covering the second voltage application electrode 105 and the second opposing electrode 107, respectively. The third and the fourth translucent resin films 110 and 111 are alignment films for aligning the second liquid crystal 113, and are made, for example, of polyvinyl alcohol films. By rubbing the third and the fourth translucent resin films 110 and 111, the second liquid crystal 113 can be aligned in a predetermined direction. The alignment direction of the first liquid crystal 112 is perpendicular to the alignment direction of the second liquid crystal 113.

The first liquid crystal 112 is disposed between the first and second translucent resin films 108 and 109 (between the first voltage application electrode 104 and the first opposing electrode 106). The first liquid crystal 112 functions as a phase changing layer that changes the phase of the incident light. For the first liquid crystal 112, it is possible to use a nematic liquid crystal, for example. By changing the voltage between the first voltage application electrode 104 and the first opposing electrode 106, the refractive index of the first liquid crystal 112 can be changed, which makes it possible to change the phase of the incident light.

The second liquid crystal 113 is disposed between the third and fourth translucent resin films 110 and 111 (between the second voltage application electrode 105 and the second opposing electrode 107). The second liquid crystal 113 functions as a phase changing layer that changes the phase of the incident light. For the second liquid crystal 113, it is possible to use a nematic liquid crystal, for example. By changing the voltage between the second voltage application electrode 105 and the second opposing electrode 107, the refractive index of the second liquid crystal 113 can be changed, which makes it possible to change the phase of the incident light.

The first sealing resin 114 seals the first liquid crystal 112, and is arranged between the first and the second translucent resin films 108 and 109, so that it encloses the first liquid crystal 112. The second sealing resin 115 seals the second liquid crystal 113, and is arranged between the third and the fourth translucent resin films 110 and 111, so that it encloses the second liquid crystal 113. It is possible to use, for example, an epoxy resin for the first and the second sealing resins 114 and 115.

The following explains how the optical element 100 is operated. A control voltage is applied from the outside to the segment electrodes of the first and the second voltage application electrodes 104 and 105. In this situation, the alignment direction of the first liquid crystal 112 is perpendicular to the alignment direction of the second liquid crystal 113, so that the linearly polarized light of the incoming light path is affected only by the refractive index change of the first liquid crystal 112, and phases of the power components can be imparted with the first liquid crystal 112. That is to say, the plane wave incident on the optical element 100 is converted into a spherical wave.

On the other hand, the light that is reflected by the optical recording medium 60 is linearly polarized light that is perpendicular to the incoming linearly polarized light. Therefore, this returning light is affected only by the second liquid crystal 113, and phases of the power components can be imparted with the second liquid crystal 113. Now, if the pattern of the first and the second voltage application electrodes 104 and 105 and the applied voltages are the same, then the same phase can be imparted at the incoming path and the returning path, so that the spherical wave incident on the optical element 100 can be converted into a plane wave.

In this manner, spherical aberration can be corrected also for optical polarization systems by using two liquid crystal layers with different alignment directions. By using the optical element 100 to perform the correction, favorable lens shift characteristics can be attained, as explained for Embodiment 2.

It should be noted that Embodiment 3 has been explained for the case that the optical element is provided with two liquid crystal layers, but it is also possible to arrange optical elements as explained in Embodiment 1 such that their alignment directions of the liquid crystal are perpendicular.

Embodiment 4

In Embodiment 4, an example of an optical recording/reproducing apparatus of the present invention is described. The optical recording/reproducing apparatus of Embodiment 4 records or reproduces signals on an optical recording medium, but it also can record and reproduce signals.

Figure 11:
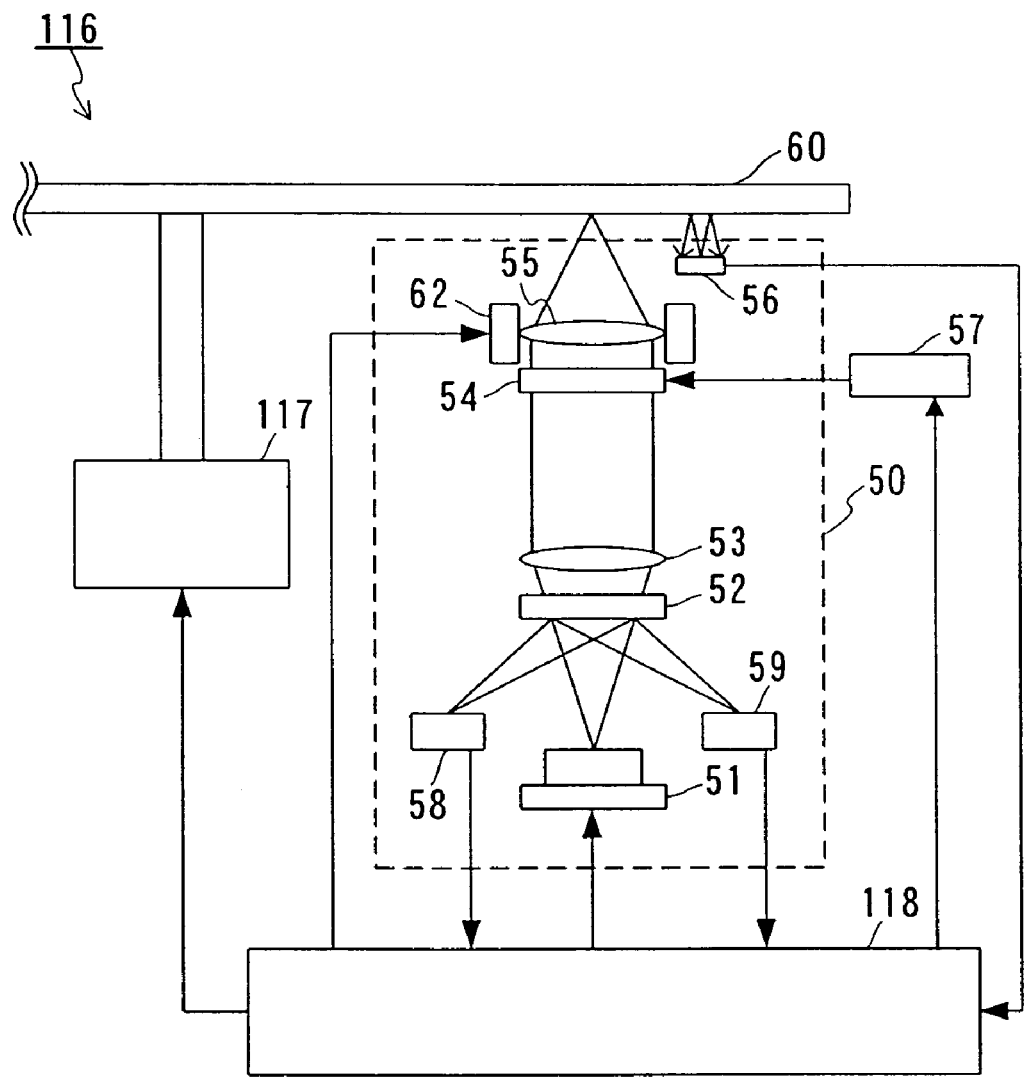
FIG. 11 schematically illustrates the configuration of an example of an optical recording/reproducing apparatus of the present invention.

FIG. 11 schematically shows the configuration of an optical recording/reproducing apparatus 116 of Embodiment 4. Referring to FIG. 11, the optical recording/reproducing apparatus 116 includes an optical head 50, an optical element driving circuit 57, a motor 117, and a processing circuit 118.

The optical head 50 is the one explained in Embodiment 2, and includes an optical element of the present invention. Instead of the optical head 50, it is also possible to use the optical head 90. Redundant explanations regarding these optical heads have been omitted.

In the optical recording/reproducing apparatus 116 of Embodiment 4, a semiconductor laser element emitting a laser beam with a wavelength in the range of 390 nm to 420 nm is used as the light source. For the objective lens, an objective lens with a NA in the range of 0.7 to 0.9 is used.

The following explains how the optical recording/reproducing apparatus 116 operates. First, when an optical recording medium 60 is set in the optical recording/reproducing apparatus 116, the processing circuit 118 gives out a signal that lets the motor 117 rotate, and the motor 117 starts to rotate. Then, the processing circuit 118 drives the light source 51, causing it to emit light. The light emitted by the light source 51 is reflected by the optical recording medium 60, and enters the first and the second photodetectors 58 and 59.

The first photodetector 58 outputs a focus error signal, which indicates the focusing condition of the light on the optical recording medium 60, and a tracking error signal, which indicates the irradiation position of the light, to the processing circuit 118. Based on these signals, the processing circuit 118 outputs a signal controlling the actuators 62, whereby light emitted by the light source 51 is focused on the desired track of the optical recording medium 60. Based on the output from the second photodetector 59, the processing circuit 118 reproduces the information that has been recorded on the optical recording medium 60.

The following is an explanation of the control when the actual base material thickness of the optical recording medium 60 differs from the design value. In the optical recording/reproducing apparatus 116, the optical head is configured such that correction of spherical aberration is unnecessary if the base material thickness of the optical recording medium 60 is the same as its design value. Therefore, correction of spherical aberration is necessary when the actual base material thickness deviates from the design value.

If the actual base material thickness of the optical recording medium 60 deviates from the design value, then the base material thickness sensor 56 outputs a signal corresponding to the deviation of the base material thickness of the optical recording medium 60 to the processing circuit 118. The processing circuit 118 controls the optical element driving circuit 57 in accordance with this received signal, so that the control signal that is necessary to correct the spherical aberration caused by the deviation of the base material thickness of the optical recording medium 60 is given by the optical element driving circuit 57 to the optical element 54. Then, the spherical aberration is corrected by the optical element 54 (see Embodiments 1 and 2 for details). Thus, the information signals recorded on the optical recording medium 60 can be reproduced correctly, even when the base material thickness of the optical recording medium 60 deviates from the design value.

Embodiment 4 has been explained as an apparatus detecting the deviation of the base material thickness with a base material thickness sensor, but the optical recording/reproducing apparatus of the present invention is not limited to an apparatus using a base material thickness sensor. For example, it is also possible to learn the deviation of the base material thickness when setting the optical recording medium 60 on the motor, and to correct the spherical aberration based on the learned deviation of the base material thickness.

Embodiment 5

In Embodiment 5, another example of an optical recording/reproducing apparatus of the present invention and a method for optical recording/reproducing using the same are described. The optical recording/reproducing apparatus and method of Embodiment 5 can record or reproduce signals with a first optical recording medium having only one recording layer or a second optical recording medium having a plurality of recording layers.

The optical recording/reproducing apparatus of Embodiment 5 includes a light source and a spherical aberration correction means arranged between the optical recording medium and the light source. More specifically, an optical recording/reproducing apparatus including an optical head in accordance with the present invention can be used. In that case, the optical element of the present invention and the objective lens function as the spherical aberration correction means. In the optical recording/reproducing apparatus of Embodiment 5, a semiconductor laser element emitting a laser beam with a wavelength in the range of 390 nm to 420 nm is used as the light source. For the objective lens, an objective lens with a NA in the range of 0.7 to 0.9 is used.

The following is an explanation for the case that the optical recording/reproducing apparatus 116 described in Embodiment 4 is used as the optical recording/reproducing apparatus of Embodiment 5.

Figure 12A:
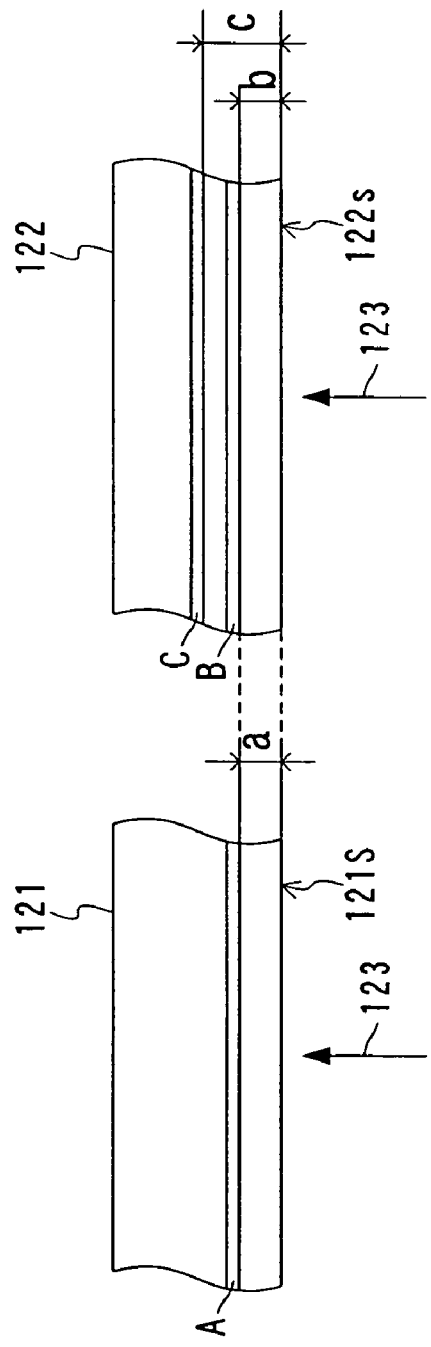
FIG. 12A illustrates a first example and FIG. 12B illustrates a second example of the base material thickness in a first optical recording medium and a second optical recording medium, which are recorded or reproduced with the optical recording/reproducing apparatus of the present invention.

FIG. 12A schematically illustrates the base material thickness of a first optical recording medium 121 and a second optical recording medium 122 for recording or reproducing with the optical recording/reproducing apparatus 116. The optical recording medium 121 includes only a recording layer A as the recording layer. The optical recording medium 122 includes recording layers B and C as the recording layers. It should be noted that the optical recording medium 122 can include two or more recording layers.

Figure 12B:
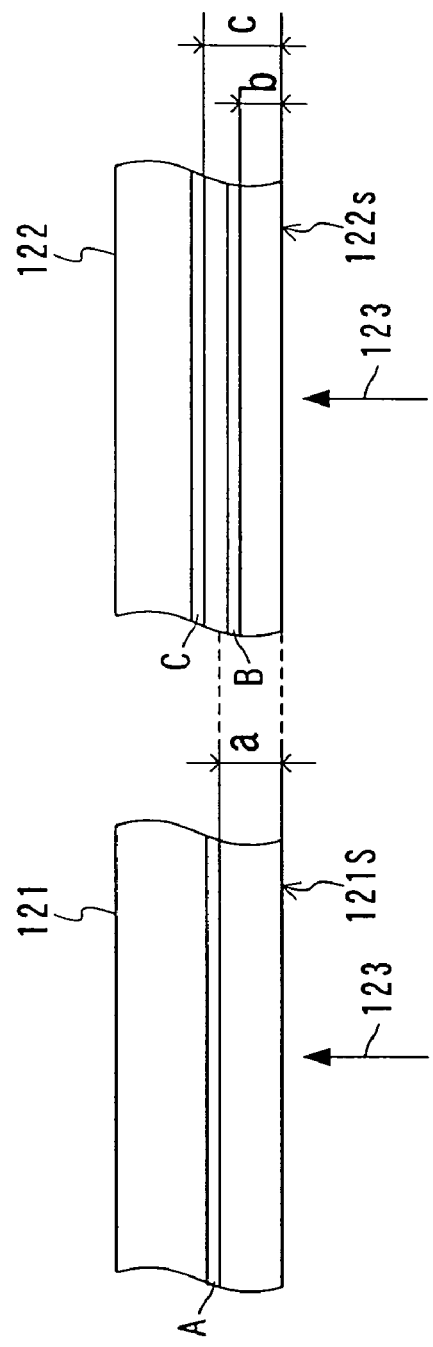
Figure 13:
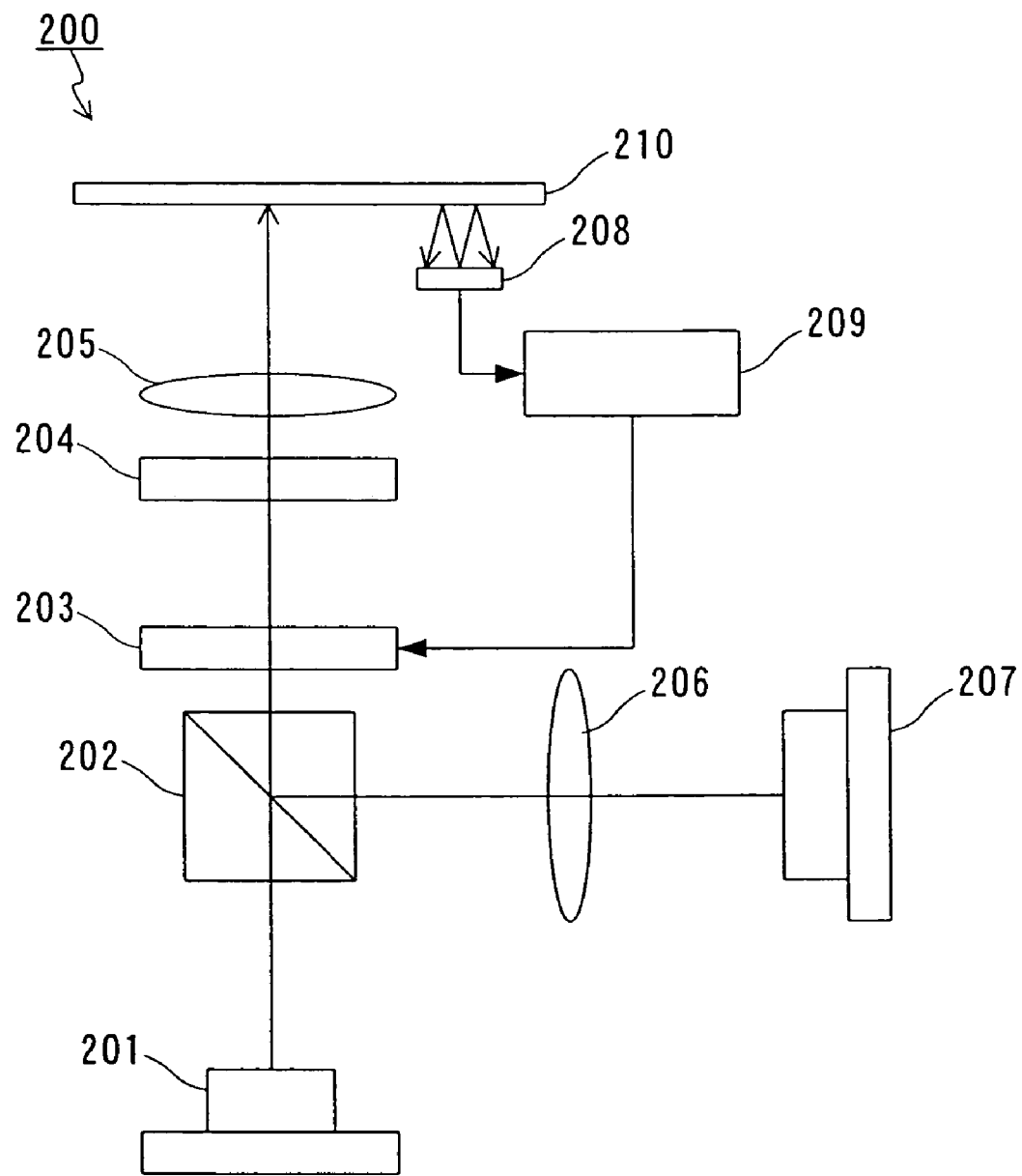
FIG. 13 schematically illustrates the configuration of an example of a conventional optical head.
Figure 14:
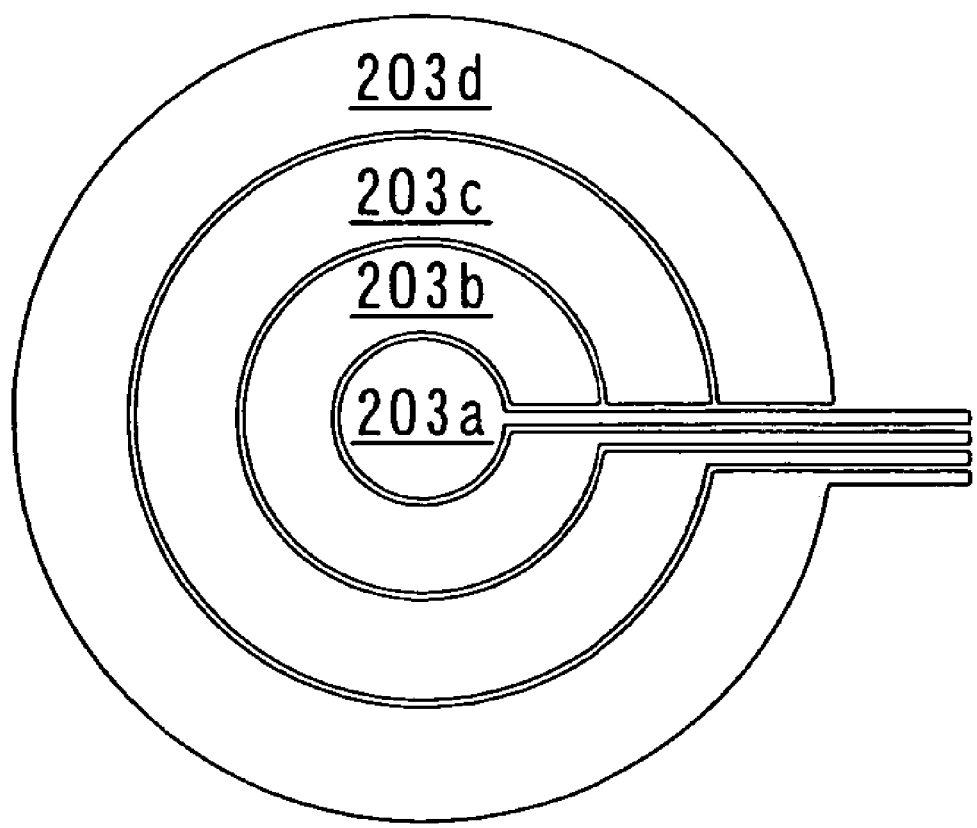
FIG. 14 is a plan view showing an example of the electrodes on a liquid crystal panel used in a conventional optical element.
Figure 15:
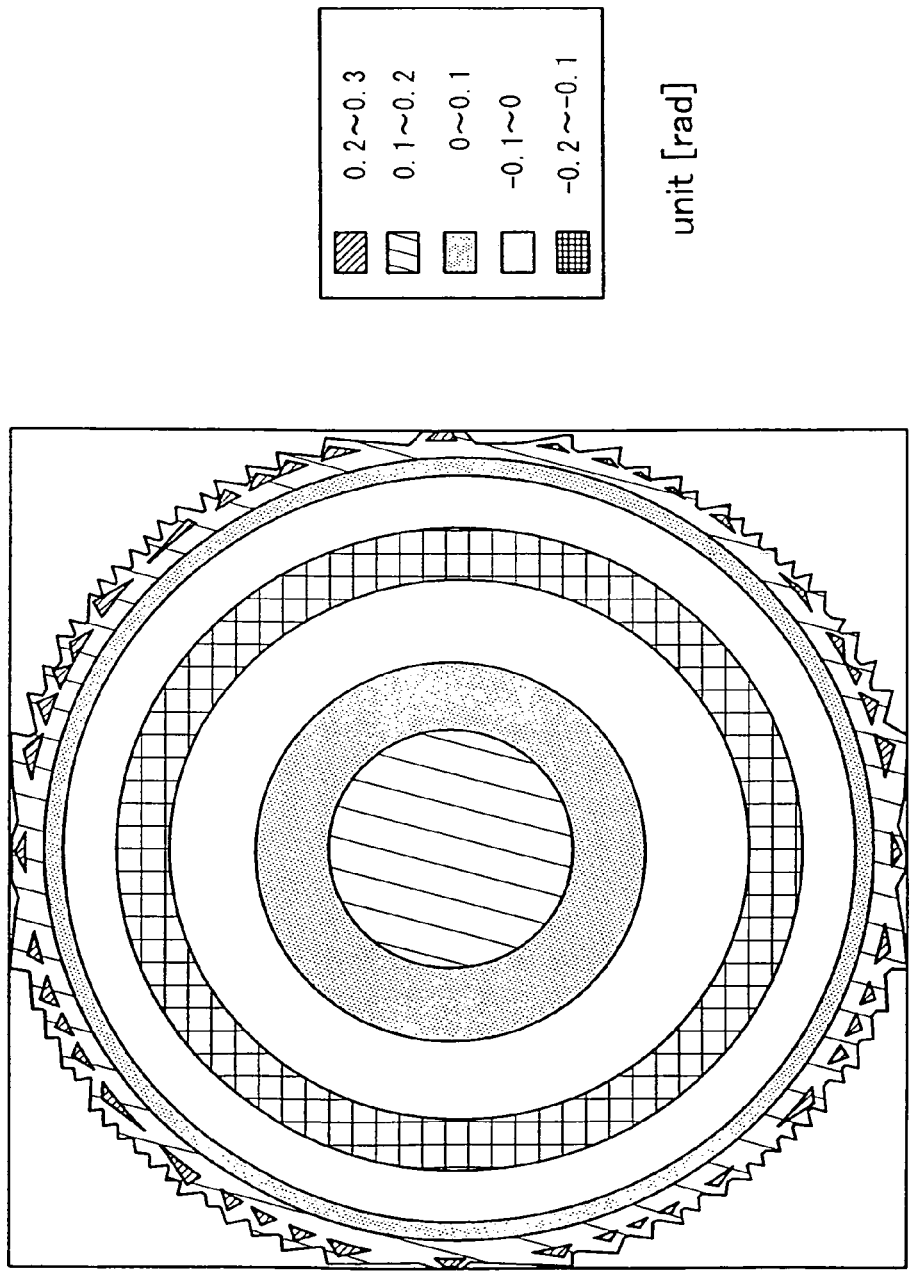
FIG. 15 shows an example of the distribution of wavefront aberration when the actual base material thickness deviates from the design value.
Figure 16:
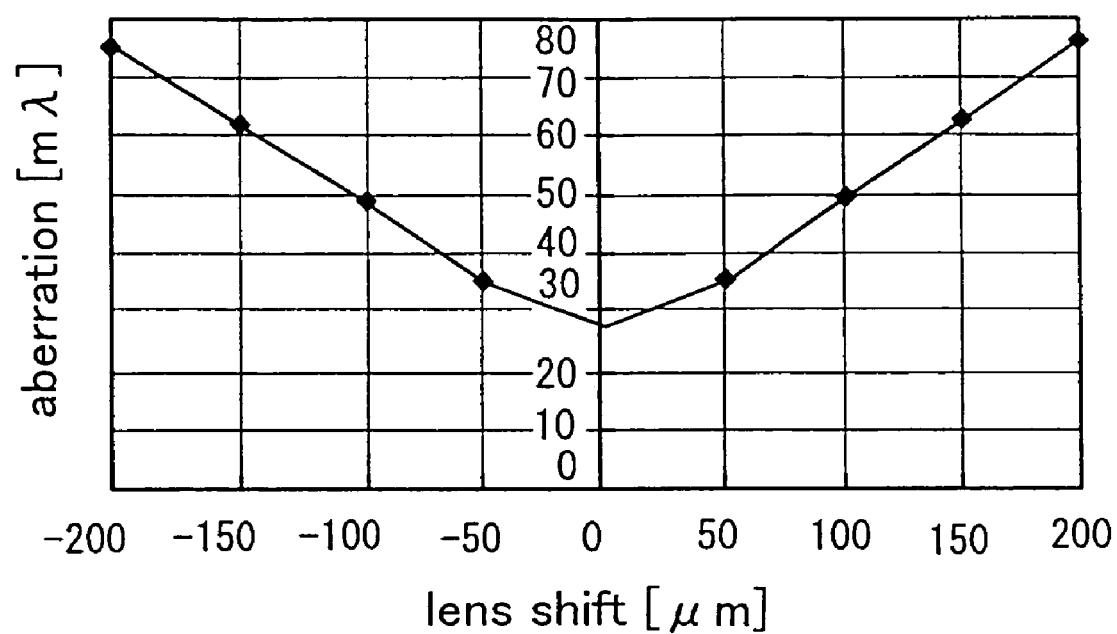
FIG. 16 is a graph showing an example of the relationship between lens shifts and aberrations when the actual base material thickness deviates from the design value.

The base material thickness for the recording layer A (that is, the distance from the surface 121s to the recording layer A) is denoted by "a" in FIG. 12A. The base material thicknesses for the recording layers B and C (that is, the distances from the surface 122s to the recording layers B and C) are denoted respectively by "b" and "c" in FIG. 12B. In the optical recording/reproducing apparatus of Embodiment 5, one base material thickness of the second optical recording medium 122 (i.e. "b" or "c") is equivalent to the base material thickness "a". FIG. 12A illustrates the case that the base material thickness "a" is equivalent to the base material thickness "b". These base material thicknesses are the total thickness of the substrate and the layers formed between the substrate and the recording layer (such as a UV cured resin). The recording layer is made of a phase-changing material whose refractive index changes when a phase change between the crystalline phase and the non-crystalline phase occurs.

It is preferable that the administrative information of the second optical recording medium 122 is recorded in the second recording layer B, for which the base material thickness is equivalent to the base material thickness "a". With this configuration, the administrative information of the optical recording medium 122 can be reproduced with the spherical aberration correction means still in the initial state.

In the optical recording/reproducing apparatus of Embodiment 5, the optical head 50 is designed to be adapted to the base material thickness "a" of the first optical recording medium 121. That is to say, the optical head 50 is designed such that it has such a margin that reproduction is possible without performing a correction of the spherical aberration for deviations of the base material thickness "a" of the first optical recording medium 121. In this case, the correction of spherical aberration becomes necessary for deviations of the base material thickness of the second optical recording medium 122.

The following explains how the optical recording/reproducing apparatus 116 of Embodiment 5 operates. First, when the optical recording medium 121 or 122 is set on the motor 117, the processing circuit 118 lets the motor 117 rotate. Then, in the initial state before performing recording or reproducing, the processing circuit 118 drives the spherical aberration correction means such that it corrects the spherical aberration for the base material thickness "a" without deciding whether the set optical recording medium is the optical recording medium 121 or 122. More specifically, an external voltage is applied to the optical element of the present invention.

Then, focusing control is carried out with a focus control means. The focus control means is constituted by the actuators 62 and the processing circuit 118.

The following is an explanation of a method for focus control. First, light is emitted by driving the light source 51, and the light reflected by the optical recording medium 60 is detected with the first photodetector 58. The first photodetector 58 outputs to the processing circuit 118 a focus error signal, which indicates the focusing condition of the light on the optical recording medium 60, and a tracking error signal, which indicates the irradiation position of the light. Based on these signals, the processing circuit 118 outputs a signal controlling the objective lens 55, whereby light emitted by the light source 51 is focused on the desired track of the optical recording medium 60. Based on the signal from the second photodetector 59, the processing circuit 118 reproduces the information that has been recorded on the optical recording medium 60.

On the other hand, if recording or reproducing is performed with the recording layer C of the second optical recording medium 122, then the spherical aberration correction means is driven such that the spherical aberration of the recording layer C is corrected. More specifically, at substantially the same time when the processing circuit 118 outputs the signal shifting the focus from the recording layer B to the recording layer C, the processing circuit 118 drives the optical element driving circuit 57 such that it outputs a signal correcting the deviation of the base material thickness. With this configuration, the signal is recorded or reproduced favorably, even when changing the recording layer used for recording or reproducing.

Thus, with the optical recording/reproducing apparatus of Embodiment 5, signals are recorded or reproduced with an optical recording/reproducing method including a first step of driving the spherical aberration correction means such that spherical aberration of the recording layer A is corrected, before the recording or reproducing. If signals are recorded or reproduced with the recording layer C, then this optical recording/reproducing method includes a second step of driving the spherical aberration correction means such that spherical aberration of the recording layer C is corrected, which is carried out after the first step. That is to say, the optical recording/reproducing apparatus of the Embodiment 5 stores in the processing circuit 118 a program for carrying out this optical recording/reproducing method.

In the optical recording/reproducing apparatus and method of Embodiment 5, spherical aberration can be corrected without deciding whether the optical recording medium has one or whether it has a plurality of recording layers, so that the time until recording or reproducing can be shortened. It should be noted that even if it is known whether the optical recording medium has only one or a plurality of recording layers, the focus control begins with the spherical aberration correction means adapted to the base material thickness "a". Also in this case, the time until the focusing control is shortened, because the spherical aberration correction means is in its initial state.

If the wavelength is shortened and the NA is increased to achieve higher densities, then the margin with respect to spherical aberration becomes smaller. Therefore, if the base material thickness of the recording layer differs, it becomes necessary to correct spherical aberration for each recording layer. In that case, assuming that the base material thicknesses of the recording layers A, B and C are different from one another, correction of spherical aberration is not necessary for the recording layer A, but correction of spherical aberration is necessary for the recording layers B and C. On the other hand, making the base material thickness of the recording layer A equivalent to the base material thickness of the recording layer B as described above, it is sufficient when spherical aberration is corrected only for the recording layer C. Therefore, in the optical recording/reproducing apparatus of Embodiment 5, the circuit for performing the correction of spherical aberration can be simplified. Also, when the base material thickness of the recording layers is learned, the base material thickness of one layer is known, so that the learning time can be shortened.

Moreover, with the optical recording/reproducing apparatus of Embodiment 5, an optical recording/reproducing apparatus reproducing with high reliability information signals recorded on the optical recording medium can be attained by using the optical element of the present invention. Furthermore, the tolerance with respect to deviations of the base material thickness of the optical recording medium 60 can be increased by using the optical element of the present invention, so that an optical recording/reproducing apparatus is attained that can be manufactured easily and at low cost.

Embodiment 6

In Embodiment 6, another example of an optical recording/reproducing apparatus of the present invention and an optical recording/reproducing method using the same are described. The optical recording/reproducing apparatus and method of Embodiment 6 can record or reproduce signals with a first optical recording medium having only one recording layer or with a second optical recording medium having a plurality of recording layers.

The optical recording/reproducing apparatus of Embodiment 6 includes a light source, a spherical aberration correction means arranged between the optical recording medium and the light source, a focus error detection means, and a focus control means. More specifically, an optical recording/reproducing apparatus including an optical head in accordance with the present invention can be used.

In the following explanations, the optical recording/reproducing apparatus 116 explained in Embodiment 4 is used for the optical recording/reproducing apparatus of the Embodiment 6. In this case, the optical element 54 of the present invention and the objective lens 55 function as the spherical aberration correction means, the first photodetector 58 functions as the focus error detection means, and the actuators 62 and the processing circuit 118 function as the focus control means. In the optical recording/reproducing apparatus of Embodiment 6, a semiconductor laser element emitting a laser beam with a wavelength in the range of 390 nm to 420 nm is used as the light source. For the objective lens, an objective lens with a NA in the range of 0.7 to 0.9 is used.

In Embodiment 6, the base material thicknesses of the first optical recording medium and the second optical recording medium that are recorded or reproduced with the optical recording/reproducing apparatus 116 differ from one another. When "a" is the base material thickness of the first optical recording medium, and "b" and "c" are the base material thicknesses of the recording layers of the second optical recording medium, then "a", "b" and "c" differ from one another (see FIG. 12B).

With the optical recording/reproducing apparatus of Embodiment 6, in the initial state before recording or reproducing signals on the optical recording medium, the spherical aberration correction means is driven so as to correct spherical aberration of the recording layer included by the first optical recording medium. Then, the focus error is detected with the focus error detection means, and focus control is carried out with the focus control means, based on the detected focus error. Recording and reproducing of the signals is performed after the focus control. For the method for correcting spherical aberration, the method for detecting the focus error, and the method for focus control, it is possible to use the methods explained in the above-described embodiments.

Thus, with the optical recording/reproducing apparatus of Embodiment 6, signals are recorded or reproduced with an optical recording/reproducing method that includes a first step of driving the spherical aberration correction means such that spherical aberration of the recording layer included in the first optical recording medium is corrected, before recording or reproducing. This optical recording/reproducing method also includes a second step, carried out after the first step, of detecting the focus error with the focus error detection means, and a third step of performing focus control with the focus control means based on the detected focus error signal. The recording or reproducing of signals is carried out after these three steps. If the optical recording medium set in the apparatus is a second optical recording medium including a plurality of recording layers, then, after finishing these steps, the spherical aberration correction means is driven based on a base material thickness error signal obtained with the base material thickness sensor, and the recording or reproducing is performed after that. In the optical recording/reproducing apparatus of Embodiment 6, the processing circuit 118 stores a program for carrying out this optical recording/reproducing method.

In the optical recording/reproducing apparatus and the optical recording/reproducing method of Embodiment 6, the spherical aberration correction means is driven and focus control is performed to be adapted to the base material thickness of the recording layer of the first optical recording medium, regardless of whether the optical recording medium set in the optical recording/reproducing apparatus is a first optical recording medium or a second optical recording medium (that is, regardless of whether it is already known or not if the optical recording medium set in the optical recording/reproducing apparatus is a first optical recording medium or a second optical recording medium). With this configuration, focus control can be carried out without determining whether the optical recording medium to be recorded or reproduced is an optical recording medium with only one recording layer or an optical recording medium with a plurality of recording layers, so that the time until focus control can be shortened.

It should be noted that if it is known whether the optical recording medium subjected to recording or reproducing is a first optical recording medium or a second optical recording medium, then it is also possible to drive the spherical aberration correction means such that the spherical aberration at a standard base material thickness of the recording layer subjected to recording or reproducing is corrected. Then, the focus error can be detected with the focus error detection means, and focus control can be performed with the focus control means, based on the detected focus error. Recording or reproducing are performed after the focus control. With this method, the spherical aberration correction means is driven so as to correct the spherical aberration at a standard base material thickness before the focus control. Therefore, the deviation of the actual base material thickness from the standard base material thickness is detected with the base material thickness sensor, and recording or reproducing can be performed after complete correction of the spherical aberration based on that deviation. That is to say, in Embodiment 6, recording or reproducing is performed by an optical recording/reproducing method including a first step of acquiring the information whether the optical recording medium subjected to recording or reproducing is a first optical recording medium or a second optical recording medium. This optical recording/reproducing method also includes a second step of driving the spherical aberration correction means so as to correct spherical aberration at the standard base material thickness of the recording layer subjected to recording or reproducing, based on the acquired information, a third step of detecting the focus error with the focus error detection means, and a fourth step of performing focus control with the focus control means based on the detected focus error signal. The recording or reproducing then is performed after the focus control. In this case, the processing circuit 118 stores a program including these four steps.

In the first step, the information whether the optical recording medium subjected to recording or reproducing is a first optical recording medium with one recording layer or a second optical recording medium with a plurality of recording layers is acquired as follows. Focus error signals indicating the focus error are detected in correspondence with the recording layers. This means, if there are two recording layers, then two focus error signals are detected. Thus, if a circuit is configured that detects the number of detected signals, then it is possible to acquire the information of how many recording layers the optical recording medium has.

With this method of initially acquiring the information whether the optical recording medium subjected to recording or reproducing is an optical recording medium having only one recording layer or an optical recording medium having a plurality of recording layers, the focus control is performed after spherical aberration correction in accordance with the standard base material thickness depending on the recording layer, so that a smoother focus control becomes possible.

This embodiment has been explained for the case of using an optical recording/reproducing apparatus including the optical head 50, but it is also possible to use the optical head 90.

Furthermore, the above embodiments have been explained for the case that the optical element of the present invention is arranged between the collimating lens and the objective lens (parallel optical system), but the optical element also can be arranged between the light source and the collimating lens (divergent optical system).

Furthermore, the above embodiments have been explained for an optical head of an infinite system, but it is also possible to use an optical head of an finite system without a collimating lens for the optical head of the present invention.

Furthermore, the Embodiments 2 and 3 have been explained for the case that the deviation of the base material thickness is measured with a sensor, but it is also possible to correct the spherical aberration using a deviation of the base material thickness that has been learned.

Furthermore, the above embodiments have been explained for the case that a diffraction grating is used to separate the light reflected by the optical recording medium from the light path from the light source, but instead of the diffraction grating, it is also possible to use another optical element (for example, a half mirror).

Furthermore, the above embodiments have been explained for an optical recording medium recording information only optically, but the present invention also can be applied to optical recording media, in which information is recorded optically and magnetically. Furthermore, the present invention is not limited to disk-shaped optical recording media, and also can be applied to card-shaped optical recording media, for example.

Furthermore, the above embodiments have been explained for optical elements changing the phase of transmitted light, but it is also possible to use an optical element that changes the phase when incident light is reflected. For example, it is possible to use an optical element with a phase changing layer made of piezoelectric material, and to change the phase of the reflected light by distorting the phase changing layer.

Furthermore, the above-described optical recording/reproducing apparatuses and optical recording/reproducing methods have been explained for the case of using an optical element of the present invention and an objective lens as the spherical aberration correction means, but it is also possible to use other spherical aberration correction means. For example, two lenses arranged along the optical axis can be used as the spherical aberration correction means. Spherical aberration then can be corrected by moving these two lenses on the optical axis.

Furthermore, the above-described optical recording/reproducing apparatuses and optical recording/reproducing methods have been explained for the case of using a photodetector as the focus error detection means, but it is also possible to use other focus error detection means.

Furthermore, the above-described optical recording/reproducing apparatuses and optical recording/reproducing methods have been explained for the case of using a processing circuit and actuators as the focus control means, but it is also possible to use other focus control means.

Furthermore, the above-described embodiments have been explained for the case of using a semiconductor laser as the light source, but it is also possible to use, for example, an SHG light source generating second harmonics as the light source.

Furthermore, the above-described embodiments have been explained for the case of using a phase changing optical recording medium as the optical recording medium, but it is also possible to use other optical recording media, such as optomagnetic recording media.

As explained above, with the optical element of the present invention, an optical head can be configured in which the correctional effect does not deteriorate when the objective lens is shifted. Therefore, with an optical head using the optical element of the present invention, a first optical recording/reproduction apparatus, or a first optical recording/reproduction method, signals can be recorded or reproduced with high reliability.

Furthermore, with a second, third, or fourth optical recording/reproduction apparatus of the present invention, or a second or third optical recording/reproduction method of the present invention, the time until recording or reproducing can be shorted, and the apparatus can be simplified.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An optical recording/reproducing apparatus for recording or reproducing signals on a first optical recording medium including only one recording layer and on a second optical recording medium including a plurality of recording layers, the optical recording/reproducing apparatus comprising:
   a light source;
   a spherical aberration correction device arranged between the optical recording medium and the light source;
   a focus error detection device; and
   a focus control device;
   wherein, in an initial state before recording or reproducing signals on the first or the second optical recording medium, the spherical aberration correction device is driven so as to correct spherical aberration of the recording layer included in the first optical recording medium, then, a focus error is detected with the focus error detection device, and focus control is performed with the focus control device, based on the detected focus error.

2. An optical recording/reproducing apparatus for recording or reproducing signals on a first optical recording medium including only one recording layer and on a second optical recording medium including a plurality of recording layers, the optical recording/reproducing apparatus comprising:
   a light source;
   a spherical aberration correction device arranged between the optical recording medium and the light source;
   a focus error detection device; and
   a focus control device;
   wherein, if it is known whether the optical recording medium subjected to recording or reproducing is a first optical recording medium or a second optical recording medium, then the spherical aberration correction device is driven so as to correct spherical aberration at a standard base material thickness of the recording layer subjected to recording or reproducing, then, a focus error is detected with the focus error detection device, and focus control is performed with the focus control device, based on the detected focus error.

3. An optical recording/reproducing method for recording or reproducing signals with an optical recording/reproducing apparatus on a first optical recording medium including only one recording layer and on a second optical recording medium including a plurality of recording layers,
   wherein the optical recording/reproducing apparatus includes a spherical aberration correction device, a focus error detection device, and a focus control device;
   the method comprising:
   a first step of driving the spherical aberration correction device so as to correct spherical aberration of the recording layer included in the first optical recording medium;
   a second step performed after said first step of detecting a focus error with the focus error detection device; and
   a third step performed after said second step of performing focus control with the focus control device, based on the detected focus error;
   wherein the first, second and third step are carried out before recording or reproducing.

4. An optical recording/reproducing method for recording or reproducing signals with an optical recording/reproducing apparatus on a first optical recording medium including only one recording layer and on a second optical recording medium including a plurality of recording layers,
   wherein the optical recording/reproducing apparatus includes a spherical aberration correction device, a focus error detection device, and a focus control device;
   the method comprising:
   a first step of acquiring information about whether the optical recording medium subjected to recording or reproducing is a first optical recording medium or a second optical recording medium;
   a second step, performed after said first step, of driving the spherical aberration correction device so as to correct spherical aberration at a standard base material thickness of the recording layer subjected to recording or reproducing, based on said information;
   a third step, performed after said second step, of detecting a focus error with the focus error detection device; and
   a fourth step, performed after said third step, of performing focus control with the focus control device, based on the detected focus error;
   wherein the first, second, third, and fourth steps are carried out before recording or reproducing.

* * * * *

UNITED STATES PATENT AND TRADEMARK OFFICE
CERTIFICATE OF CORRECTION

PATENT NO. : 7,158,450 B2
APPLICATION NO. : 10/892066
DATED : January 2, 2007
INVENTOR(S) : Wada et al.

It is certified that error appears in the above-identified patent and that said Letters Patent is hereby corrected as shown below:

Title page, second column, line 8 of the Abstract: "optical element, includes" should read --optical element includes--.
Column 26, line 17(claim 3): "a second step performed after said first step of" should read --a second step, performed after said first step, of--.
Column 26, line 19(claim 3): "a third step performed after said second step of" should read --a their step, performed after said second step, of--.
Column 26, line 22(claim 3): "step" should read --steps--.

Signed and Sealed this

Third Day of July, 2007

JON W. DUDAS
*Director of the United States Patent and Trademark Office*